United States Patent
Kawamura et al.

(10) Patent No.: US 9,183,136 B2
(45) Date of Patent: Nov. 10, 2015

(54) STORAGE CONTROL APPARATUS AND STORAGE CONTROL METHOD

(75) Inventors: Atsushi Kawamura, Yokohama (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 634 days.

(21) Appl. No.: 13/512,143

(22) PCT Filed: May 16, 2012

(86) PCT No.: PCT/JP2012/003208
§ 371 (c)(1),
(2), (4) Date: May 25, 2012

(87) PCT Pub. No.: WO2013/171792
PCT Pub. Date: Nov. 21, 2013

(65) Prior Publication Data
US 2013/0311707 A1 Nov. 21, 2013

(51) Int. Cl.
G06F 13/00 (2006.01)
G06F 13/28 (2006.01)
G06F 12/02 (2006.01)

(52) U.S. Cl.
CPC .................................. *G06F 12/0246* (2013.01)

(58) Field of Classification Search
CPC .................................................... G06F 12/0246
See application file for complete search history.

(56) References Cited

U.S. PATENT DOCUMENTS

| 2006/0179212 A1 | 8/2006 | Kim et al. |
| 2009/0070520 A1 | 3/2009 | Mizushima |
| 2009/0132619 A1 * | 5/2009 | Arakawa et al. ............... 707/205 |

FOREIGN PATENT DOCUMENTS

| JP | 2006-221627 A | 8/2006 |
| JP | 2009-064251 A | 3/2009 |
| WO | WO 2005/066792 A2 | 7/2005 |

OTHER PUBLICATIONS

PCT International Search Report and Written Opinion on application PCT/JP2012/003208 mailed Feb. 5, 2013; 10 pages.

* cited by examiner

*Primary Examiner* — Eric S Cardwell
(74) *Attorney, Agent, or Firm* — Foley & Lardner LLP

(57) ABSTRACT

A storage control apparatus comprises a storage unit, an association unit, and an execution unit. The storage unit stores association information showing multiple physical chunks which are configured in a physical address space of a nonvolatile semiconductor memory, multiple logical storage areas which are configured in a logical address space of the nonvolatile semiconductor memory, multiple logical chunks which are respectively associated with the multiple physical chunks, and an association between a logical storage area and a logical chunk. The association unit changes the association by changing the association information in accordance with a state of the nonvolatile semiconductor memory, and identifies based on the association information a physical storage area corresponding to a logical storage area specified in an input/output request from a computer. The execution unit executes the input/output request with respect to the identified physical storage area.

12 Claims, 24 Drawing Sheets

| BLOCK NUMBER | IN-BLOCK PAGE NUMBER | ATTRIBUTE | ADDRESS |
|---|---|---|---|
| 0 | 0 | INVALID | NONE |
| | 1 | VALID | LOGICAL #0 |
| | 2 | INVALID | NONE |
| | 3 | VALID | LOGICAL #1 |
| ... | | | |
| 100 | 0 | FREE | NONE |
| | 1 | FREE | NONE |
| | 2 | FREE | NONE |
| | 3 | FREE | NONE |
| ... | | | |

604 → BLOCK NUMBER
603 → IN-BLOCK PAGE NUMBER
601 → ATTRIBUTE
602 → ADDRESS

| BLOCK NUMBER | IN-BLOCK PAGE NUMBER | ATTRIBUTE | ADDRESS |
|---|---|---|---|
| 0 | 0 | INVALID | NONE |
| | 1 | INVALID | NONE |
| | 2 | INVALID | NONE |
| | 3 | INVALID | NONE |
| ... | | | |
| 100 | 0 | VALID | LOGICAL #0 |
| | 1 | VALID | LOGICAL #1 |
| | 2 | FREE | NONE |
| | 3 | FREE | NONE |
| ... | | | |

604 — BLOCK NUMBER
603 — IN-BLOCK PAGE NUMBER
601 — ATTRIBUTE
602 — ADDRESS

| BLOCK NUMBER | IN-BLOCK PAGE NUMBER | ATTRIBUTE | ADDRESS |
|---|---|---|---|
| 0 | 0 | FREE | NONE |
|   | 1 | FREE | NONE |
|   | 2 | FREE | NONE |
|   | 3 | FREE | NONE |
| ⋮ | ⋮ | | |
| 100 | 0 | VALID | LOGICAL #0 |
|   | 1 | VALID | LOGICAL #1 |
|   | 2 | FREE | NONE |
|   | 3 | FREE | NONE |
| ⋮ | ⋮ | | |

604 → BLOCK NUMBER
603 → IN-BLOCK PAGE NUMBER
601 → ATTRIBUTE
602 → ADDRESS

Figure 13:
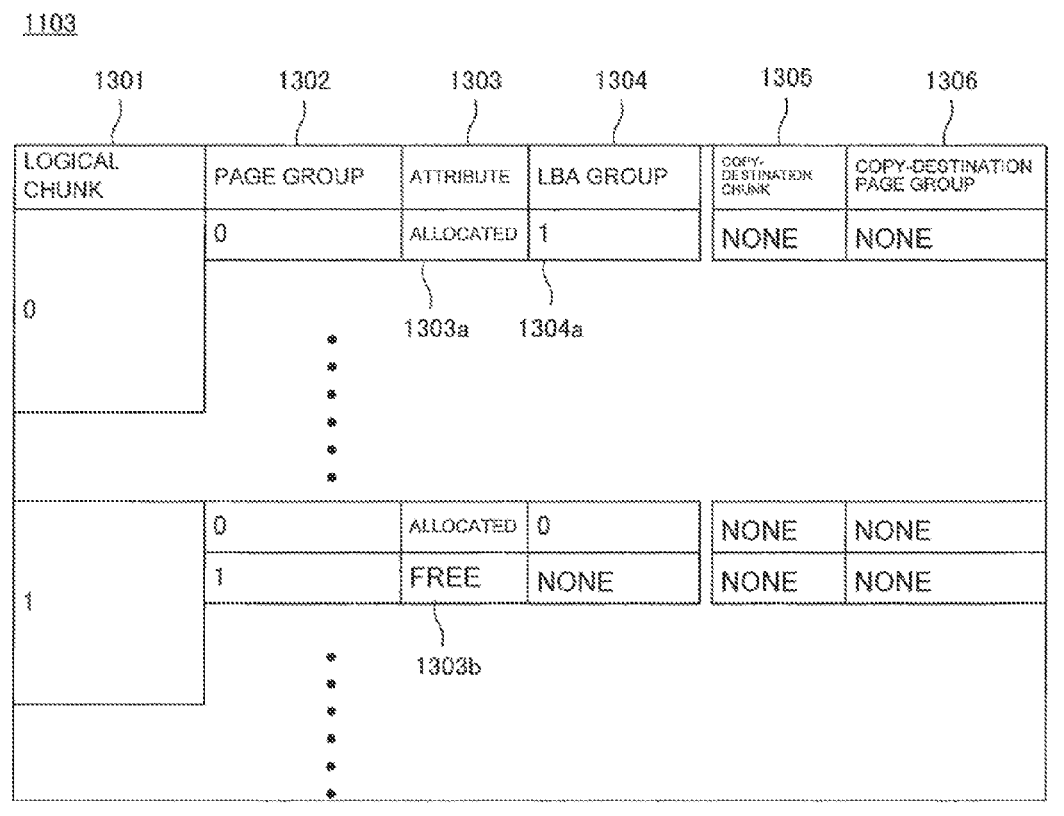

| LOGICAL CHUNK | PAGE GROUP | ATTRIBUTE | LBA GROUP | COPY-DESTINATION CHUNK | COPY-DESTINATION PAGE GROUP |
|---|---|---|---|---|---|
| 0 | 0 | ALLOCATED (1303a) | 1 (1304a) | NONE | NONE |
| | ⋮ | | | | |
| 1 | 0 | ALLOCATED | 0 | NONE | NONE |
| | 1 | FREE (1303b) | NONE | NONE | NONE |
| | ⋮ | | | | |

| LOGICAL CHUNK | PAGE GROUP | ATTRIBUTE | LBA GROUP | COPY-DESTINATION CHUNK | COPY-DESTINATION PAGE GROUP |
|---|---|---|---|---|---|
| 0 | 0 | MIGRATION IN PROCESS (1303a) | 1 | 1 (1305a) | 1 (1306a) |
| | ⋮ | | | | |
| 1 | 0 | ALLOCATED | 0 | NONE | NONE |
| | 1 | MIGRATION IN PROCESS (1303b) | 1 | NONE | NONE |
| | ⋮ | | | | |

Fig. 15

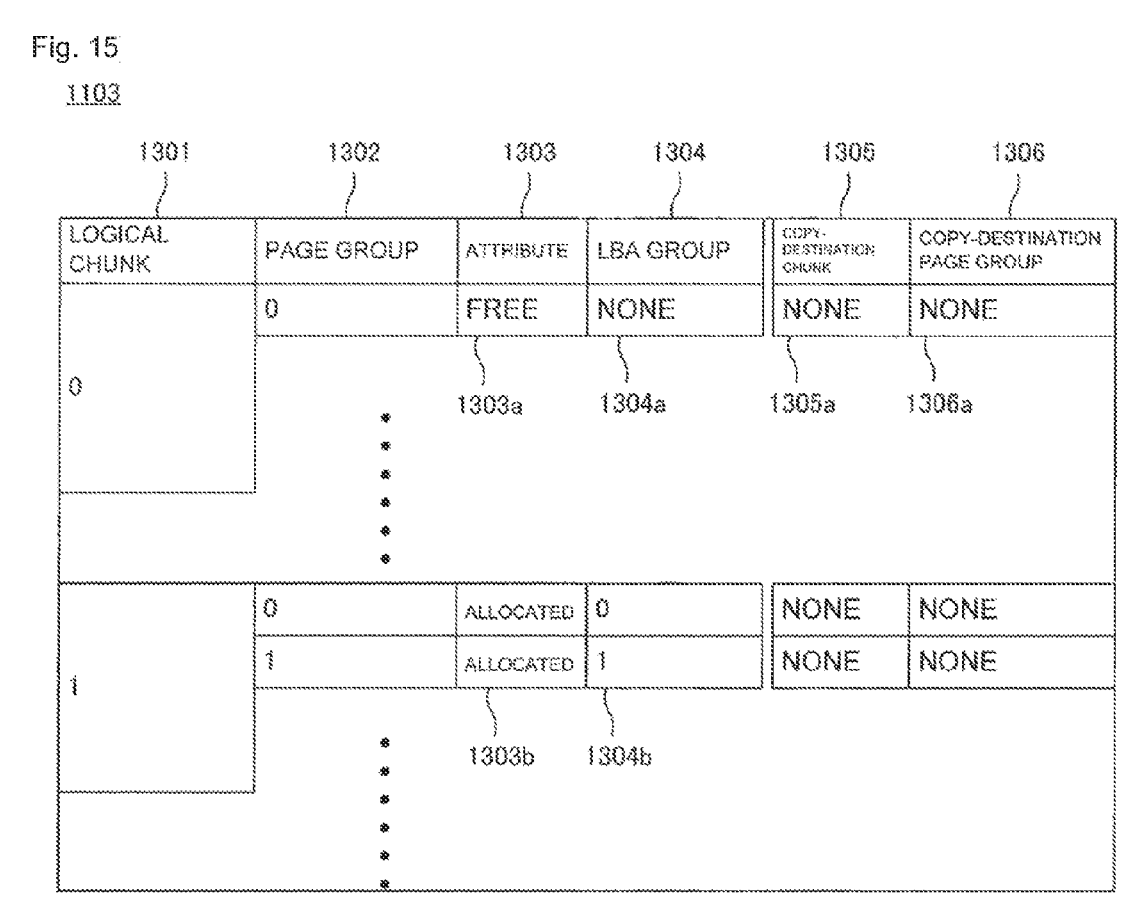

| LOGICAL CHUNK | PAGE GROUP | ATTRIBUTE | LBA GROUP | COPY-DESTINATION CHUNK | COPY-DESTINATION PAGE GROUP |
|---|---|---|---|---|---|
| 0 | 0 | FREE | NONE | NONE | NONE |
| | ⋮ | | | | |
| 1 | 0 | ALLOCATED | 0 | NONE | NONE |
| | 1 | ALLOCATED | 1 | NONE | NONE |
| | ⋮ | | | | |

| LBA GROUP | LOGICAL CHUNK | PAGE GROUP | WRITE FREQUENCY |
|---|---|---|---|
| 0 | 1 | 0 | MEDIUM |
| 1 | 2 | 1 | HIGH |
| 2 | 0 | 1 | LOW |

| LOGICAL CHUNK | ATTRIBUTE | MAXIMUM NUMBER OF ALLOCATABLE GROUPS |
|---|---|---|
| 0 | hot | 2 |
| 1 | cold | 4 |
| 2 | cold | 5 |

2500

| LBA GROUP | LOGICAL CHUNK | PAGE GROUP | LBA GROUP PRIORITY |
|---|---|---|---|
| 0 | 1 | 0 | MEDIUM |
| 1 | 2 | 1 | HIGH |
| 2 | 0 | 1 | LOW |

2600

| LOGICAL CHUNK | LOGICAL CHUNK PRIORITY | PRECEDING COMMAND LOCATION |
|---|---|---|
| 0 | HIGH | NONE |
| 1 | MEDIUM | 0x00aa |
| 2 | LOW | 0x00bb |

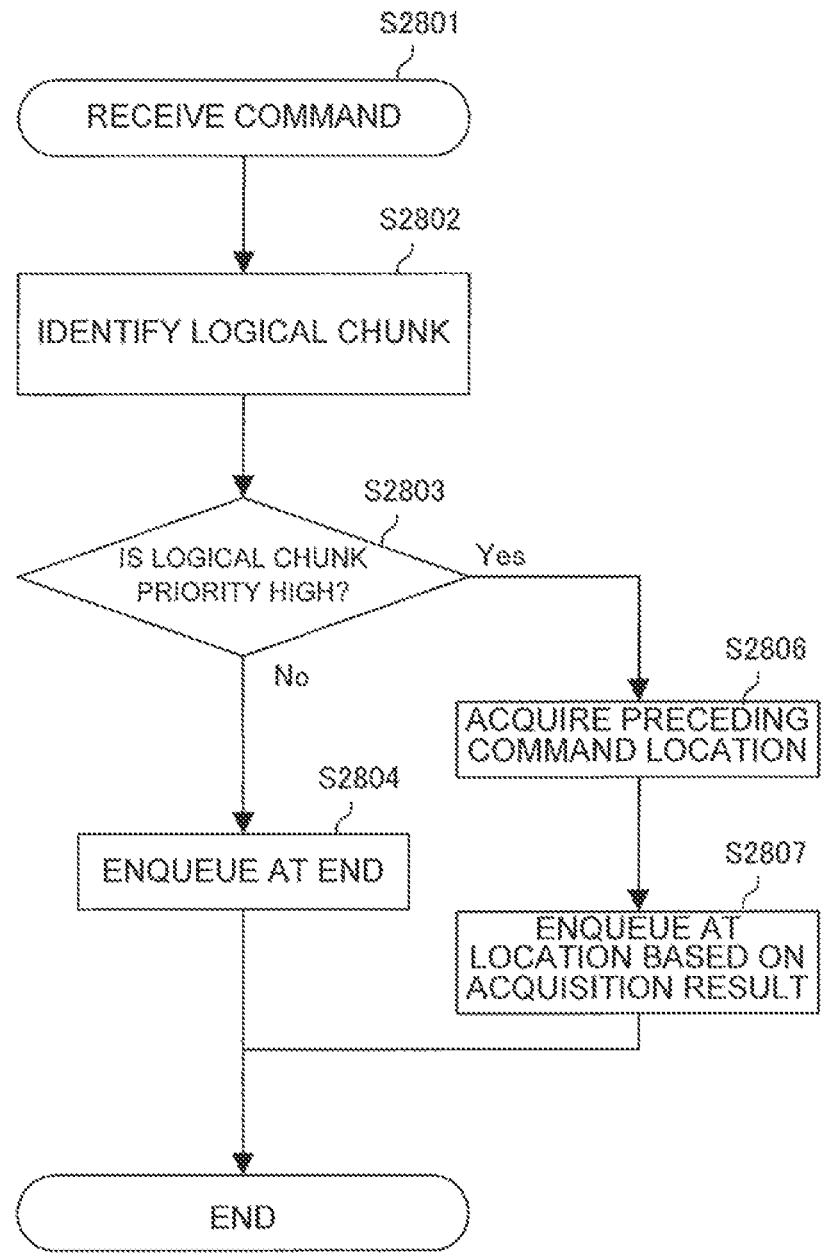

STORAGE CONTROL APPARATUS AND STORAGE CONTROL METHOD

TECHNICAL FIELD

The present invention relates to technology for associating a logical address with a physical address in a storage apparatus.

BACKGROUND ART

A conventional storage apparatus uses a magnetic disk, an optical disk, or other such random access-enabled nonvolatile storage medium as a data storage medium. Today's mainstream storage apparatus comprises multiple small-sized disk drives.

In line with advances in semiconductor technology in recent years, batch erasable nonvolatile semiconductor memory has been developed. One such nonvolatile semiconductor memory, for example, is a NAND-type flash memory. A storage apparatus, which uses flash memory as the storage medium, is considered to be superior to a storage apparatus comprising multiple small-sized disk drives in terms of power savings and faster access.

A flash memory will be explained here. In a flash memory, a block is a storage area, which is a unit for the batch erasing of data, and a page is a storage area, which is a unit for reading and writing data. As will be explained further below, multiple pages are disposed inside a single block. The characteristics of the flash memory make it impossible for stored data to be directly rewritten. That is, when rewriting stored data, the flash memory saves stored valid data to a different block. Next, the flash memory erases the stored data in block units. Then, the flash memory writes data to the erased block(s). Thus, the rewriting of data in a flash memory accompanies the erasing of data block by block. However, the time it takes to erase one block's worth of data in a flash memory is approximately one order of magnitude longer than the time required to write one page's worth of data. Therefore, the data rewrite performance of the flash memory declines when a block's worth of data is erased every time a page's worth of data is to be rewritten. In a ease where the storage medium is a flash memory, it is known that data is written to the flash memory using an algorithm, which conceals the time spent erasing data from the flash memory.

Normally, a flash memory data rewrite operation is performed using a system, which writes data one time to an unused area, and data is not erased each time data is to be rewritten. However, since the unused areas inside the flash memory diminish when data rewrites become repetitive, the need arises to restore the storage area to a reusable state by erasing unnecessary data, which has been written to the flash memory. Consequently, a block regeneration process, which copies only the valid data inside a block comprising old data to an unused area, and restores the copy-source block to a reusable state by erasing this block is known for the high-speed rewriting of data in a flash memory. This will be called reclamation hereinbelow. This reclamation is executed for a block in which there is a large amount of invalid data.

Meanwhile, the flash memory is limited as to the number of times data can be erased. For example, 100,000 erases per block are guaranteed. The problem is that, in a case where the number of erases of a certain block increases in accordance with data rewrites being concentrated in this block, it becomes impossible to erase data from this block, making this block unusable. For this reason, in a case where the storage medium is a flash memory, a process for equalizing the number of erases for each block is known for preventing data erase processing from being concentrated on a specific block.

Furthermore, in a flash memory, the read error rate increases over time even for a write-once page. An error, which occurs even when data is simply being stored like this, is called a retention error. To avoid this, an operation for writing a page for which a fixed period of time has passed since a write to another page is known. This operation is called a refresh. The problem of equalization already mentioned and the impact on performance must also be taken into consideration for a refresh.

In order to conceal data erase time and equalize the number of data erases, which were mentioned above, a flash memory module performs a logical-physical address translation process for translating a logical address to a physical address at the time of a data write. The flash memory module comprises one or more flash memory chips, and a flash memory controller for controlling the reading/writing of data from/to the flash memory chip. This flash memory controller performs the logical-physical address translation process. The flash memory controller also stores information for the logical-physical address translation process as a logical-physical address translation table. Hereinbelow, the logical-physical address translation process may be called logical-physical translation, and the logical-physical address translation table may be called the logical-physical translation table.

The logical-physical translation plays an important role in the efficient use of the flash memory. In a case where a logical-physical translation with a low degree of freedom is used, the size of the logical-physical translation table is held in check, but performance declines as a result of frequent reclamations. Alternatively, in a case were logical-physical translation with a high degree of freedom is used, the size of the logical-physical translation table becomes enormous, and, in addition, the cost of control greatly increases. In order of solve for these problems, a method for using a specific area inside a block as an update data storage area, and a method for retaining multiple FTLs (flash translation layers), which are control layers for a flash memory comprising a logical-physical translation table, and switching to an optimal FTL in accordance with a type of access are known (for example, Patent Citations 1 and 2).

PTL 1: Japanese Patent Application Laid-open No. 2009-64251
PTL 2: Japanese Patent Application Laid-open No. 2006-221627

SUMMARY OF INVENTION

Technical Problem

Flash memory storage management information has tended to increase in line with flash memory downscaling and capacity increases. In particular, the logical-physical translation table accounts for most of this management information, and as such, is the main cause of increases in management information in large-capacity flash memories.

Placing constraints on logical-physical translation is effective at reducing management information, but, on the other hand, a logical-physical translation with a low degree of freedom leads to lower performance and shorter service life due to inefficient physical resource allocation.

As an example of a logical-physical translation with a high degree of freedom, a method for making the allocation unit of the logical-physical translation table a flash memory page is conceivable, but the size of the logical-physical translation table will increase in line with an increase on the number of pages.

Also, when a fixed physical resource is allocated for each logical address allocation unit, resource utilization efficiency cannot be improved in a case where I/O requests are concentrated on a portion of a partitioned area. Furthermore, allocating a fixed physical resource for each logical address allocation unit makes flexible policy control impossible.

Solution to Problem

To solve for the above-mentioned problems, a storage control apparatus, which is one mode of the present invention, comprises a storage unit, an association unit, and an execution unit. The storage unit stores association information showing multiple physical chunks which are configured in a physical address space of a non-volatile semiconductor memory, multiple logical storage areas which are configured in a logical address space of the nonvolatile semiconductor memory, multiple logical chunks which are respectively associated with the multiple physical chunks, and an association between a logical storage area and a logical chunk. The association unit changes the association by changing the association information in accordance with a state of the nonvolatile semiconductor memory, and identifies based on the association information a physical storage area corresponding to a logical storage area specified in an input/output request from a computer. The execution unit executes the input/output request from the computer with respect to the identified physical storage area.

Advantageous Effects of Invention

According to one aspect of the present invention, it is possible to flexibly control the association between a logical address and a physical address while reducing the size of the management information for associating the logical address with the physical address in the nonvolatile semiconductor memory.

BRIEF DESCRIPTION OF DRAWINGS

FIG. 6 shows a first state of a logical-physical translation table.
FIG. 7 shows a second state of the logical-physical translation table.
FIG. 8 shows a third state of the logical-physical translation table.
FIG. 13 shows a first state of a chunk allocation table.
FIG. 14 shows a second state of the chunk allocation table.
FIG. 15 shows a third state of the chunk allocation table.

FIG. 19 shows a write frequency management table.
FIG. 20 shows a chunk attribute table.
FIG. 28 shows a command enqueue process.

BEST MODE FOR CARRYING OUT THE INVENTION

The embodiment of the present invention will be described in detail below using the drawings. This embodiment is merely an example for realizing the present invention and does not limit the technical scope of the present invention.

In the following explanation, various information may be explained using the expression "* table", but the various information may be expressed using a data structure other than a table. To show that the various information is not dependent on the data structure, "* table" can be called "*** information".

Furthermore, in the following explanation, there may be cases where the processing is explained having a "program" as the doer of the action, but since the stipulated processing is performed in accordance with being executed by a processor (for example, a CPU (Central Processing Unit)) while using a storage resource (for example, a memory) and a communication control device (for example, a communication port) as needed, the processor may be the doer of the processing. Processing, which is explained having the program as the doer of the action, may be regarded as processing performed by a management system. Either all or part of the program may be realized using dedicated hardware. Thus, processing, which is explained having the program as the doer of the action, may be regarded as processing performed by a controller. The controller may comprise a processor and a storage resource for storing a computer program executed by the processor, or may comprise the above-mentioned dedicated hardware. A computer program may be installed in respective computers from a program source. The program source, for example, may be either a program delivery server or a storage medium.

Mode for the Invention 1
(Storage Apparatus Configuration)

A storage apparatus related to the embodiment of the present invention will be explained below.

Figure 1:
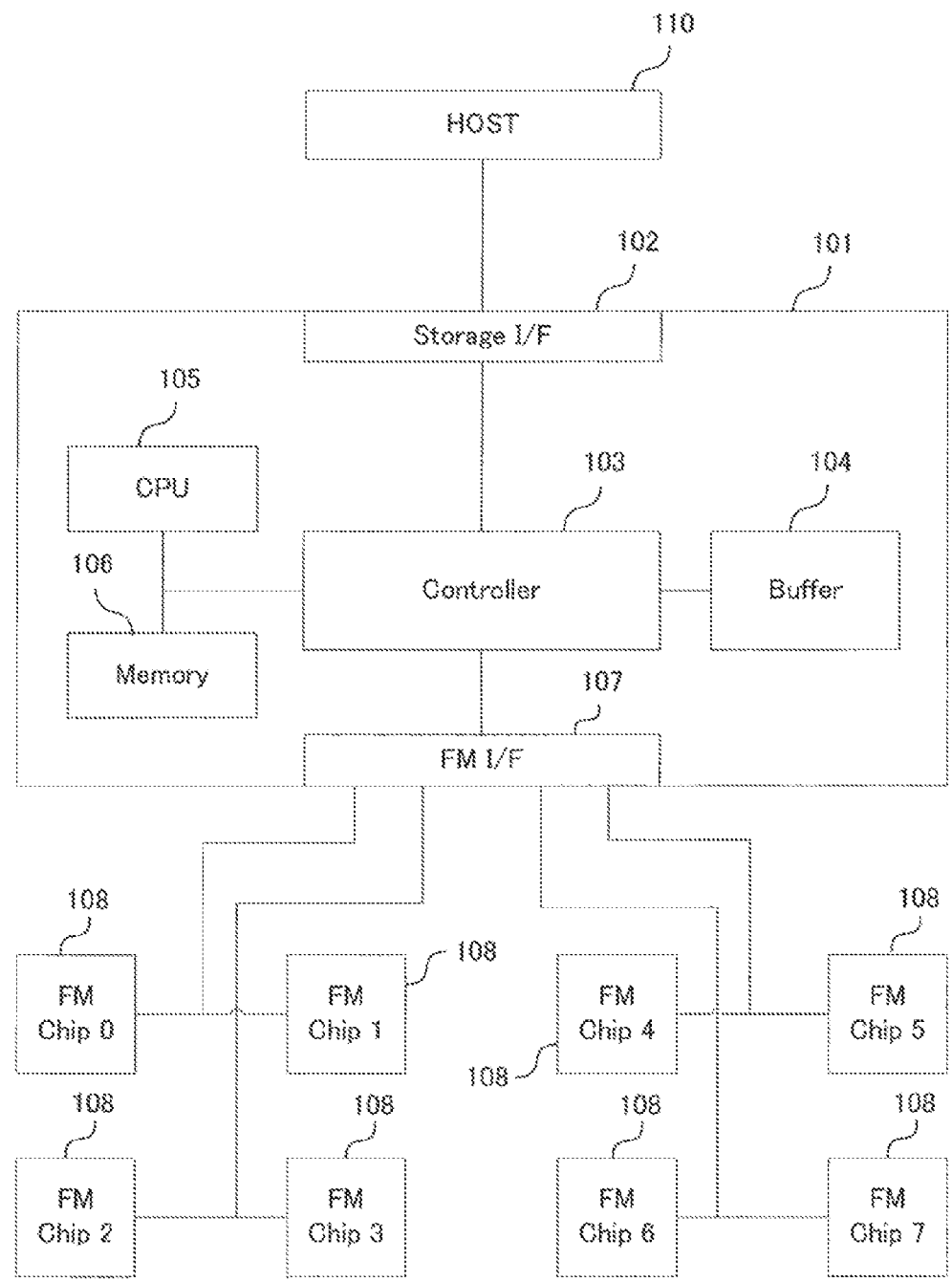
FIG. 1 shows the configuration of a storage apparatus.

FIG. 1 shows the configuration of a storage apparatus. This storage apparatus comprises a control device, and one or more storage devices. The storage apparatus, for example, is a flash memory module. The control device, for example, is a flash memory control apparatus 101. The storage devices, for example, are multiple flash memory chips 301. In the following explanation and in the drawings, the flash memory chip 301 may be called FM (Flash Memory) chip.

The flash memory control apparatus 101 comprises a storage interface 102, a flash memory controller 103, a CPU 1.05, a memory 106, a buffer 104, and a flash memory interface 107. In the following explanation and in the drawings, the flash memory controller 103 may be called controller. Furthermore, the storage interface, 102 may be called storage I/F (Interface) or higher-level interface. The flash memory interface 107 may be called FM-I/F (Interface) or lower-level interface. The memory 106 may be called main memory.

The storage interface 102 is coupled to a host 110, which is a higher-level apparatus, and communicates with the host 110. The host 110 is also called a host computer. For example, SATA (Serial Advanced Technology Attachment), SAS (Serial Attached Small Computer System Interface), FC (Fibre Channel) or other such storage interfaces may be used in the storage interface 102, and PCI (Peripheral Components Interconnect)-Express or another such path interface may be used. The storage interface 102 receives a host I/O command, which is an I/O request from the host 110.

The flash memory interface 107 is coupled to numerous flash memory chips 301.

The CPU 105 is a processor for controlling the entire flash memory control apparatus 101, and operates on the basis of a program stored in the memory 106. For example, the CPU 105 references information for a logical-physical translation stored in the memory 106 and controls the reading; writing of data from/to the flash memory chip 301 in accordance with an I/O request received from the host 110. The CPU 105 also executes a reclamation and wear-leveling in accordance with the utilization status of the flash memory chip 301.

The flash memory controller 103 is controlled by the CPU 105, and executes the reading/writing of data from/to the flash memory chip 301 via the flash memory interface 107. The flash memory controller 103 also controls communications with the host 110 through the storage interface 102.

In this mode for the invention, the flash memory control apparatus 101 comprises the CPU 105 external to the flash memory controller 103. However, the flash memory controller 103 may be configured as a single LSI (Large Scale Integration), which comprises the CPU 105, a higher-level interface, and a lower-level interface. The flash memory control apparatus 101 and the CPU 105 may also be another control device.

The memory 106 and the buffer 104 are volatile storage media, which make faster access possible, and, for example, are DRAM (Dynamic Random Access Memory). The memory 106 is a workspace used for direct control by the CPU 105, and provides shorter latency than the buffer 104. Alternatively, the buffer 104 is a user data buffer, and, in addition, stores a large-size table, which cannot be stored in the memory 106. The memory 106 and the buffer 104 may be storage devices of other types.

In this mode for the invention, the memory 106 and the buffer 104 are separate, but may be realized as a single storage medium. The memory 106 may also comprise a flash memory, a HDD (Hard Disk Drive) or other such nonvolatile storage media.

The internal architecture of the flash memory storage apparatus 101 is not limited to this mode for the invention, and one or multiple devices may be substituted for the each function.

Figure 2:
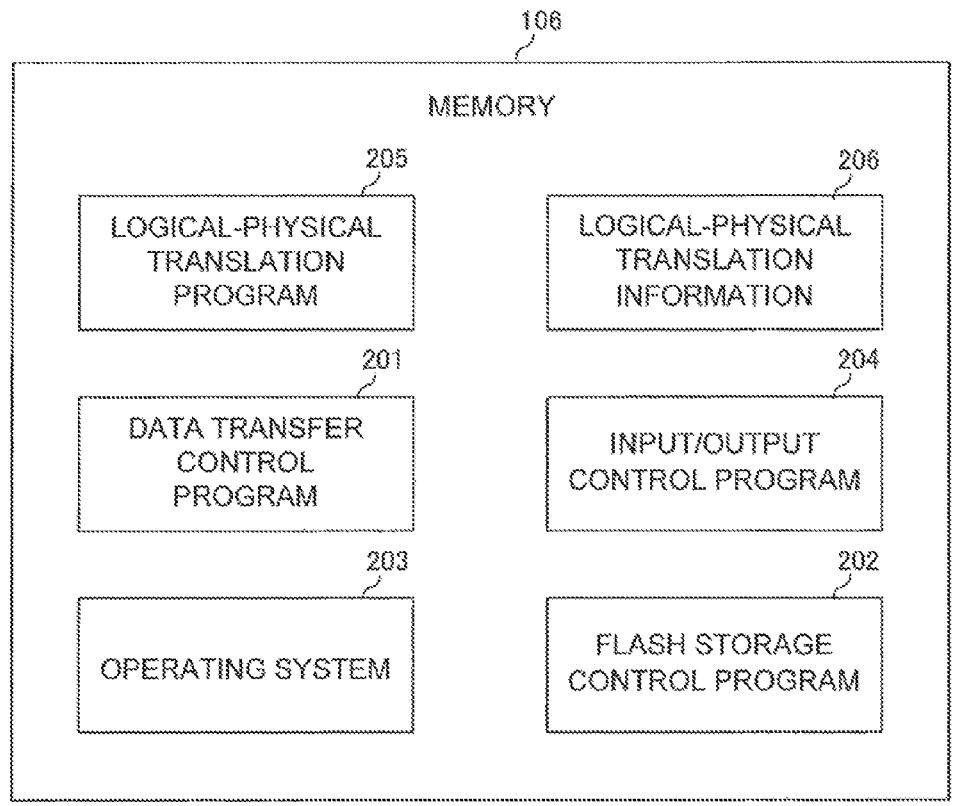
FIG. 2 shows information stored in a memory.

FIG. 2 shows information stored in the memory 106. The memory 106, for example, stores an operating system 203, a flash storage control program 202, a data transfer control program 201, an input/output control program 204, a logical-physical translation program 205, and logical-physical translation information 206.

The operating system 203 performs basic processing, such as scheduling when the CPU 105 executes the respective programs.

The flash storage control program 202 manages a logical volume, which the flash memory control apparatus 101 provides to the host 110 or manages the buffer 104, and performs control for the flash memory control apparatus 101 to operate as a storage device.

The data transfer control program 201 controls the flash memory controller 103.

The input/output control program 204 controls the storage interface 102 and the flash memory interface 107.

The logical-physical translation information 206 is information showing the association (mapping) of a logical address with a physical address. In accordance with this, the flash memory module provides a logical volume to the host 110.

The logical-physical translation program 205 acquires an I/O request (an input/output request) issued by the host 110 or the flash memory control apparatus 101, and uses the logical-physical translation information 206 to identify a physical storage area corresponding to a logical storage area specified in this I/O request. That is, the logical-physical translation program 205 translates a logical address on the logical volume to a physical address on the flash memory chip 301. In this mode for the invention, the logical address, for example, is a LBA (Logical Block Address). The logical-physical translation program 205 manages the logical-physical translation information 206, and registers or changes the information in the logical-physical translation information 206.

Figure 3:
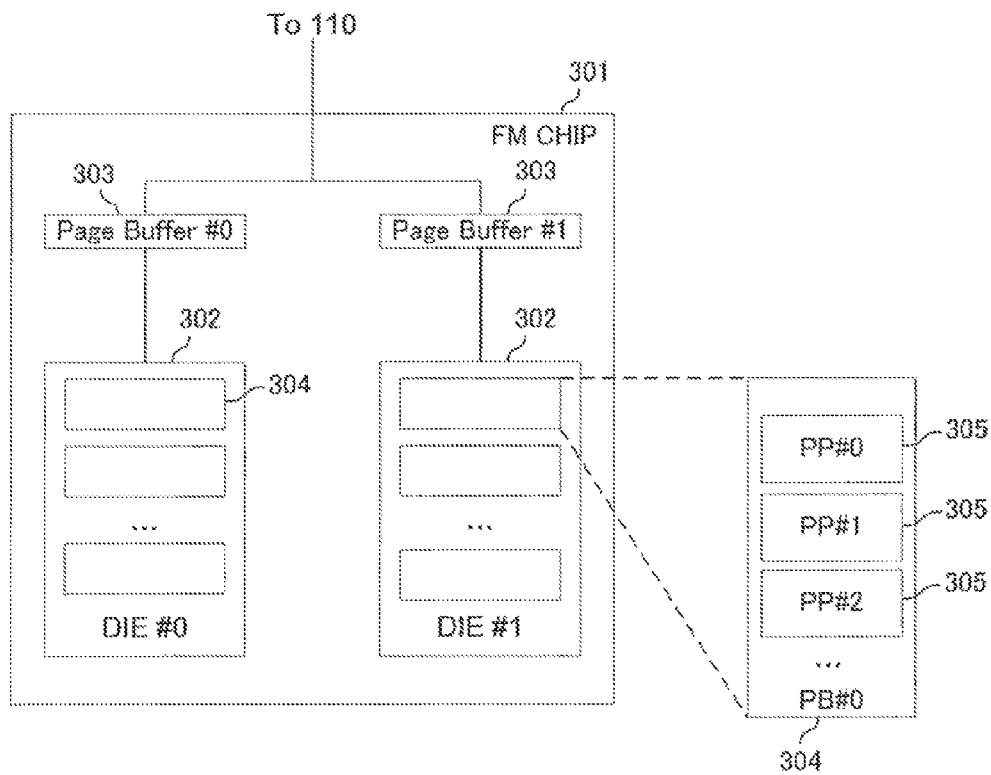
FIG. 3 is the internal configuration of a flash memory chip.

FIG. 3 shows the internal configuration of the flash memory chip 301. The flash memory chip 301 comprises multiple dies (Die) 302 and multiple page buffers 303 for temporarily storing target data of a flash memory I/O command issued from the flash memory control apparatus 101. The multiple page buffers 303 are each coupled to multiple dies 302. The page buffer 303, for example, is a volatile semiconductor memory, such as a DRAM (Dynamic Random Access Memory). The die 302, for example, is a nonvolatile semiconductor memory, such as a NAND—type flash memory. In this mode for the invention, a page buffer #0 is coupled to a die #0, and a page buffer #1 is coupled to a die #1. Each die 302 comprises multiple physical blocks (PB) 304. The physical block 304 is the erase unit in the flash memory chip 301. The physical block 304 comprises multiple physical pages (PP) 305. The physical page 305 is the write/read unit in the flash memory chip 301. In the following explanation and in the drawings, the dies 302 and the page buffers 303 inside the flash memory chip 301 may be omitted.

As used here, a write is a data write to an erased physical page 305, and a read is the reading of data, which is written in the physical page 305, Rewriting cannot be carried out with respect to a physical page 305 to which a write has been performed; a physical block 304 erase must be executed one time. In accordance with the erase process, data, which is stored in multiple physical pages 305 comprising the physical block 304, is erased, making it possible to write to these physical pages 305 once again. It is not possible to erase only one physical page 305.

The flash memory chip 301 receives a command, such as write, read, or erase, from the flash memory control apparatus 101 via the flash memory interface 107.

The physical page 305 is 2 Kbytes, 4 Kbytes, 8 Kbytes, and so forth in size, and the number of physical pages comprising a physical block 304 takes a value of 128, 256, and so forth.

(First Comparative Example)

Logical-physical translation information 206 showing the association between a logical address and a physical address in page units will be explained below as a first comparative example.

Figure 4:
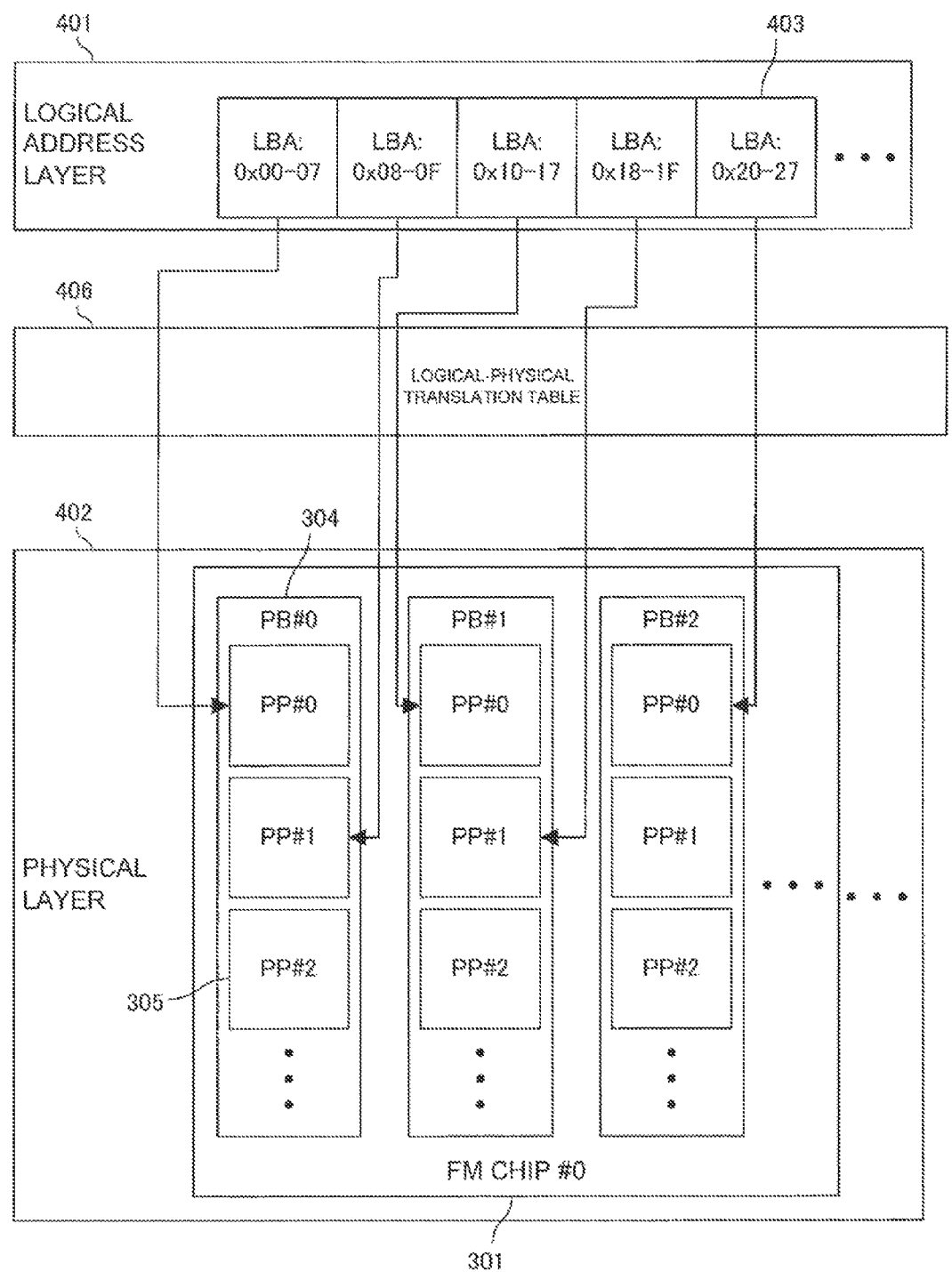
FIG. 4 shows logical-physical translation information of a first comparative example.

FIG. 4 shows logical-physical translation information 206 of the first comparative example.

The logical-physical translation information 206 of the first comparative example defines a logical address layer 401, which shows a logical address space of a logical volume provided to the host 110, and a physical layer 402, which shows a physical address space of the flash memory chip 301. The logical-physical translation information 206 comprises a logical-physical translation table 406, which shows the relationship between the logical address layer 401 and the physical layer 402.

The physical layer 402 defines physical addresses on multiple flash memory chips 301. The physical layer 402 defines multiple physical blocks 304. Each physical block 304 comprises multiple physical pages 305.

The logical address layer 401 defines a logical address space on a logical volume. In this mode for the invention, the logical address space on the logical volume is partitioned into multiple logical pages 403. It is supposed that the size of each logical page 403 is the same as the size of the physical page 305 of the flash memory chip 301. In this mode for the invention, it is supposed that the size of the logical page 403 is eight volume blocks. A volume block is the unit for configuring a logical volume, and, for example, corresponds to a LBA.

The logical-physical translation table 406 directly associates the logical address layer 401 with the physical layer 402. That is, one logical page 403 inside the logical address layer 401 is associated with one physical page 305 inside the physical layer 402. The logical-physical translation program 205 uses the logical-physical translation table 406 to translate a logical address denoting a logical page 403 to a physical address denoting a physical page 305.

In the example of FIG. 4, the flash memory chip 301 is indicated by a flash memory chip number, such as #0. The respective physical blocks 304 inside the flash memory chip 301 are indicated by physical block numbers, such as #0, #1, and so forth. The respective physical pages 305 inside a block are indicated by physical page numbers, such as #0, #1, and so forth. Each logical page 403 is indicated by a start LBA, such as 0x00, 0x08, and so forth. For example, a logical page 403 having a LBA range of 0x00 through 0x07 is allocated to the physical page #0 of the physical block #0 of the flash memory chip #0. Each logical page 403 may be indicated by a logical page number, such as #0, #1, and so forth. In a case where a read request specifying a logical page 403 with a start LBA of 0x00 has been issued from the host 110, the flash memory controller 103 receives this read request, and in accordance with this read request, uses the logical-physical translation program 205 to identify the physical page #0 of the physical block #0 of the flash memory chip #0 as the physical address corresponding to the logical page 403 with the start LBA of 0x00, reads data from the identified physical page 305, and returns a read result, which includes the read data, to the host 110.

in the example of FIG. 4, it is supposed that the size of the logical page and the size of the physical page are the same, but these sizes do not necessarily have to be the same. In a case where the logical page size is smaller than the physical page size, for example, in a case in which the logical page size is one half the physical page size, a storage location can be decided using a smaller range of addresses within the logical space. That is, it is possible to store four volume blocks having the LBA range of 0x00 through 0x03 and four volume blocks having the LBA range of 0x04 through 0x07 in separate physical pages 305.

Alternatively, in a case where the logical page size is larger than the physical page size, it is preferable to place some limits on the arrangement of the physical pages 305. For example, the LBA range of 0x00 through 0x0f is associated with two physical pages 305, and it is preferable that these physical pages 305 be a physical page group, which is decided on the basis of a fixed rule, such as two consecutive physical pages 305 inside the same physical block 304. This is equivalent to virtually expanding and using a physical page 305, and enables management information to be reduced.

Figure 5:
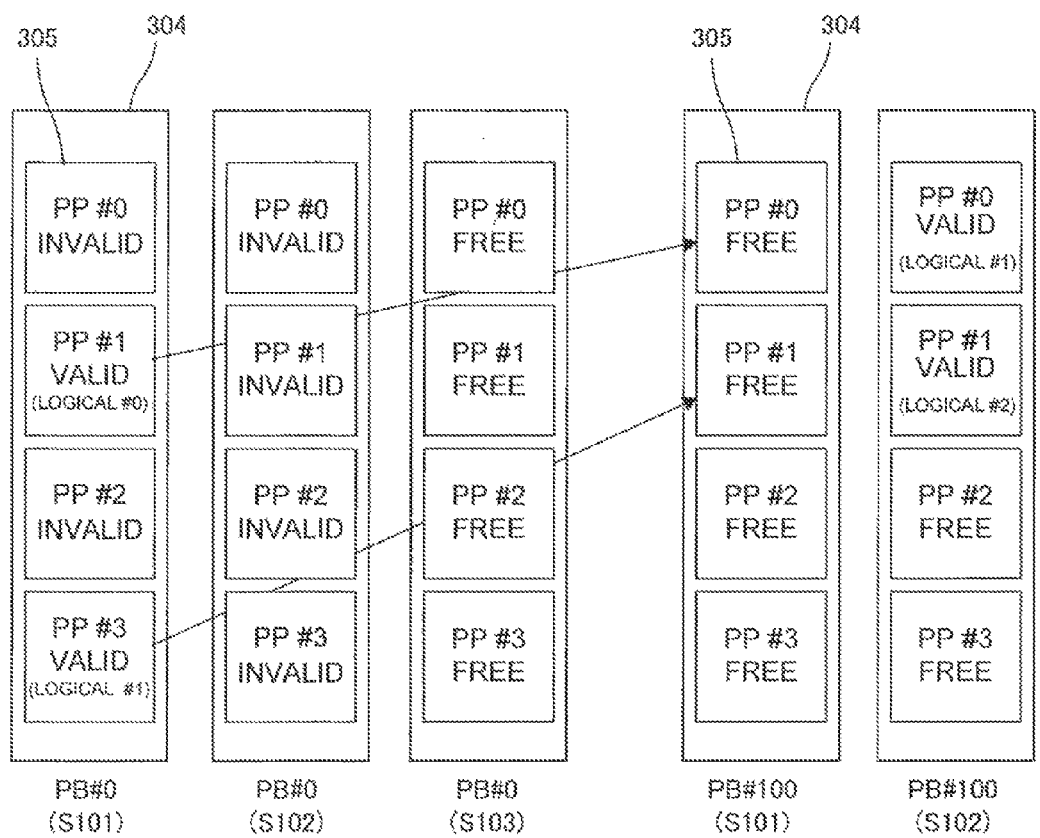
FIG. 5 shows a change in the state of a physical block in accordance with a reclamation.

FIG. 5 shows a change in the status of a physical block in accordance with a reclamation. As described hereinabove, in a case where a write has been performed to a flash memory module, the logical-physical translation program 205 associates the logical address referenced from the host 110 with the physical page 305 to which the write was actually performed. In addition, in a case where another write has been executed to the same logical address, the flash memory chip 301 is not able to perform a rewrite to the same physical page 305, and as such, the logical-physical translation program 205 maintains the association by rewriting the logical-physical translation table 406 subsequent to the write being performed to another physical page 305.

However, when a certain amount of writes have been executed, there are fewer physical pages 305 to which host data writes can be performed. In the following ex-planation, a physical page 305 in which valid data is stored will be called a valid page, a physical page 305 in which invalid data is stored will be called an invalid page, and a physical page 305, which has been erased, will be called a free page. Consequently, the logical-physical translation program 205 organizes a physical block 304 in which valid pages are mixed together with invalid pages, which store pre-update data made obsolete by the execution of a write to the same logical page, and creates a free block, which is an erased physical block 304. This process is called reclamation.

In the example of FIG. 5, a physical block #0 is the reclamation target. The physical block #0 comprises physical pages #0, #1, #2 and #3. A physical block #1 comprises physical pages #0, #1, #2 and #3. First, in the physical block #0 of S101, physical pages #1 and #3 are valid pages, and are respectively associated with logical pages #0 and #1. Also, in the physical block #0 of S101, physical pages #0 and #2 are invalid pages. The physical block #1 of S101 is a free block. That is, in the physical block #1 of S101, each of the physical pages #0, #1, #2, and #3 is a free page.

The logical-physical translation program 205 respectively copies the data of the physical pages #1 and #3 in the physical block #0 to the physical pages #0 and #1 of a physical block #100 at this time. In so doing, the logical-physical translation program 205 updates the logical-physical translation table 406, and maintains the association. As a result of this, in S102, the physical pages #0 through #3 in the physical block #0 all become invalid pages. Next, in S103, the logical-physical translation program 205 executes an erase with respect to the physical block #0. In accordance with this, the physical block #0 becomes a free block, and the physical pages 305 in the physical block #0 become free pages.

The updating of the logical-physical translation table 406 during a write process will be explained.

FIG. 6 shows a first state of the logical-physical translation table 406. This first state is the state prior to the start of an update of the logical-physical translation table 406. The logical-physical translation table 406 comprises an entry for each physical page 305. Each entry comprises a block number 604, an in-block page number 603, an attribute 601, and an address 602.

The block number 604 is the number of the physical block 304 to which a physical page 305 belongs. The in-block page number 603 is the number of the relevant page 305 in the relevant physical block 304. As described hereinabove, the number of physical pages in each physical block 304 is from around 128 through 256, but for the sake of simplicity, it is supposed here that the number of physical pages in each physical block 304 is 4, and that the in-block page number 603 is from 0 through 3.

The attribute 601 shows the attribute of the data stored in the relevant physical page 305. The values of the attribute 601 are defined as being "valid", "invalid" and "free", "Invalid", for example, indicates a state in which valid data had been stored in the relevant physical page 305 but was migrated to another physical page 305, or a state in which the host 110 explicitly instructed invalidation, "Valid" indicates a state in which the relevant physical page 305 is allocated and written to the logical page 403 at the point in time of the start of the update of the logical-physical translation table 406. "Free", for example, indicates a state in which data has never been written to the relevant physical page 305, or a state in which data has not been written to the relevant physical page 305 since the physical block 304 to which the relevant physical page 305 belongs was erased. The address 602 indicates the logical page 403 associated with the relevant physical page 305. The address 602 here is the logical page number of the logical page 403. The address 602 may be the start LBA of the logical page 403.

The physical page #1 of the physical block #0 is storing valid data and is associated with the logical page #0. The physical page #3 is also storing valid data and is associated with the logical page #1. Therefore, these valid pages must be copied (page copy) to another physical block 304 in order to erase the physical block #0.

FIG. 7 shows a second state of the logical-physical translation table 406. This second state is the state subsequent to the completion of the above-mentioned page copy. In this logical-physical translation table 406, the respective attributes 601 of the physical pages #1 and #3 of the physical block #0, which had stored the valid data, are changed iron "valid" to "invalid". Meanwhile, the respective attributes 601 of the physical pages #0 and #1 of the physical block #100, which is the copy destination, are changed from "free" to "valid". Values are also stored in the corresponding addresses 602.

FIG. 8 shows a third state of the logical-physical translation table 406. This third state is the state subsequent to the completion of the erasing of the invalid physical block. As a result of the erase being executed, all of the physical pages 305 in the physical block #0 are erased, and the attribute 601 of the logical-physical translation table 406 is changed to "free". This makes it possible to write data to the physical block #0 once again.

A write process comprising a reclamation will be explained below.

Figure 9:
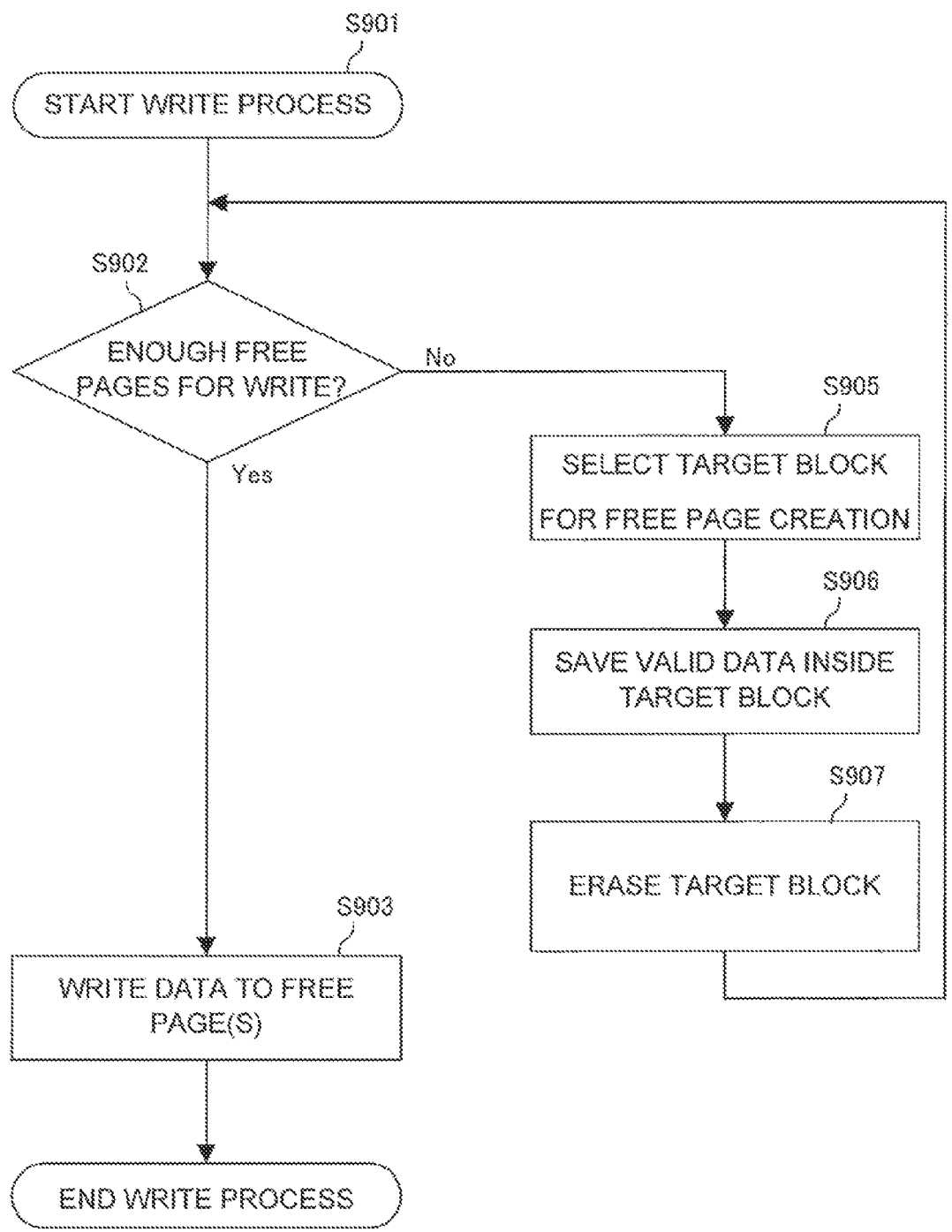
FIG. 9 shows a write process comprising a reclamation.

FIG. 9 shows a write process comprising a reclamation. Typically, a write process is started when the flash memory controller 103 receives a write request from the host 110 (S901). In the following explanation, a write request from the host 110 may be called a host write command.

The logical-physical translation program 205 first determines whether or not there are enough free pages for the write, for example, whether or not the total size of the free pages, which are suitable as data write destinations, is equal to or larger than the size of the write-target data (S902). This, as was explained hereinabove, is due to the fact that overwriting is not possible in a flash memory chip 301, and when carrying out a write, an erase must be performed beforehand. That is, in the S902, the logical-physical translation program 205 determines whether or not a writable erased physical page 305 exists.

In a case where it has been determined that there are enough free pages for the write, the logical-physical translation program 205 writes the write-target data to this free page(s) (S903) and ends this flow.

Alternatively, in a case where it has been determined that there are not enough free pages for the write, the logical-physical translation program 205 performs the free page creation processing of S905 through S907. First, the logical-physical translation program 205 selects a target block for free page creation from among multiple erase-candidate physical blocks (S905). An erase-candidate physical block, for example, is a physical block 304 in which data is written down to the last physical page 305 thereof. Due to the below-described page save process in particular, it is preferable that the erase-candidate physical block be a physical block 304 with few physical pages 305 (physical pages 305 storing valid data) associated with logical pages 403 (logical addresses). Next, the logical-physical translation program 205 saves the valid data in the target block to another free page (5906). Since the valid data is data that must not be erased as-is, the valid data must be saved to another physical block 304. In accordance with this, all the physical pages 305 in the target block become non-valid pages. A non-valid page is either an invalid page or a free page. When the save is complete, the logical-physical translation program 205 performs an erase process with respect to the target block (8907). According to the erase process of 8907, all the physical pages 305 in the target block become capable of being used as free pages. According to this free page creation process, the free pages for the write are increased. The logical-physical translation program 205 moves the processing to S902 once again, and continues the write process.

The preceding is the flow of the write process.

In this flow, the logical-physical translation program 205 performs a free page creation process during the write process, but the free page creation process may be performed asynchronously to the write process. That is, the logical-physical translation program 205 may perform the free page creation process as a separate process from the write process rather than a process, which is included in the write process. The logical-physical translation program 205, by performing the free page creation process asynchronously to the write process, eliminates the need for the free page creation process during the write process, making it possible to expect enhanced write process performance.

According to the logical-physical translation information 206 of the first comparative example explained hereinabove, the logical-physical translation program 205 performs a logical-physical translation in page units. However, a large amount of management information is necessary to associate a logical address with a physical address in page units.

(Second Comparative Example)

A method for reducing the size of logical-physical translation information compared to that of the first comparative example will be explained below as a second comparative example.

It is possible to reduce the size of the logical-physical translation information compared to the first comparative example by doing such things as changing the allocation unit from the logical address to the physical address, and placing fixed constraints on allocation.

Figure 10:
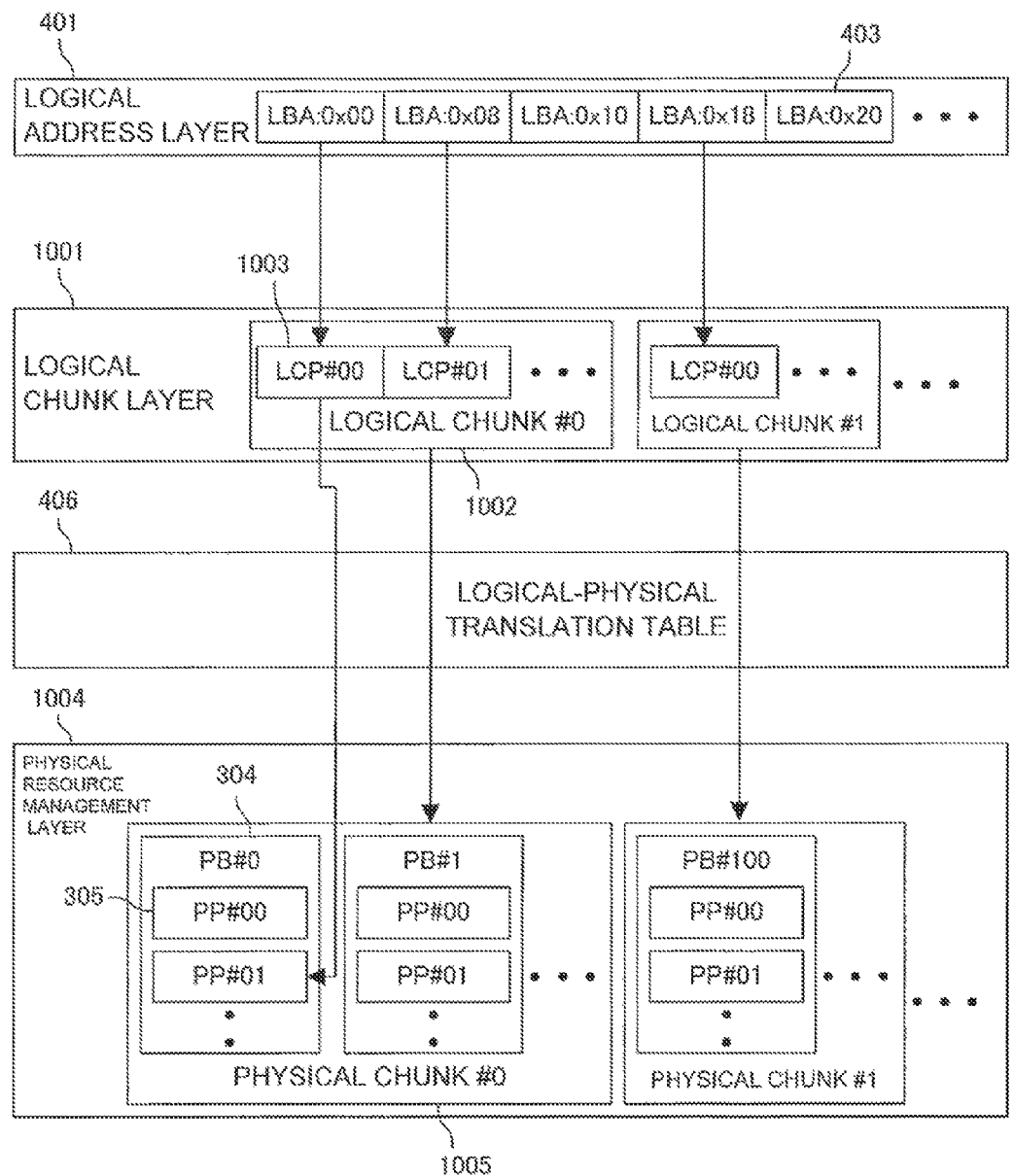
FIG. 10 shows logical-physical translation information of a second comparative example.

FIG. 10 shows the logical-physical translation information 206 of a second comparative example. When compared to the logical-physical translation information 206 of the first comparative example, the logical-physical translation information 206 of the second comparative example defines a physical resource management layer 1004 instead of the physical layer 402. The logical-physical translation information 206 of the second comparative example also defines a logical chunk layer 1001 between the logical address layer 401 and the physical resource management layer 1004.

The logical chunk layer 1001 defines multiple logical chunks 1002. The multiple logical chunks 1002 are multiple address spaces obtained by partitioning the logical address space on the logical volume. Each logical chunk 1002 comprises multiple logical chunk pages 1003. In the following explanation and the drawings, a logical chunk page 1003 may be called a LC (Logical Chunk) page or a LCP. Multiple logical pages 403 are grouped together, and this group is associated with a logical chunk 1002. A logical page 403 is associated with a LC page 1003.

Each logical chunk 1002 is indicated by a logical chunk number, such as #0, #1, and so forth. Each LC page 1003 in a logical chunk 1002 is indicated by a LC page number, such as #0, #1, and so forth.

The physical resource management layer 1004 defines multiple physical chunks 1005. Actual physical blocks 304 on a flash memory chip 301 are grouped together, and this group is associated with a physical chunk 1005. A physical chunk number, such as #0 is associated with each physical chunk 1005. For example, a rule, such as physical blocks #0 through #n are allocated to physical chunk #0, is defined. Or, a table may be used to allocate an arbitrary physical block 304 to an arbitrary physical chunk 1005. Since the associations are in physical block 304 units in this case, the management information does not increase that much.

A logical chunk 1002 is associated with a physical chunk 1005 using the logical-physical translation table 406. In addition, a LC page 1003 is associated with a physical page 305 using the logical-physical translation table 406.

In this mode for the invention, the logical chunk #0 is associated with the physical chunk #0. In accordance with this, the physical pages 305 associated with the LC pages #0, #1, and so forth in the logical chunk #0 are limited to the physical pages 305 in the physical chunk #0. This limitation makes it possible to reduce the size of the management information showing the associations of the respective logical pages 403. For example, it is supposed that the total number of physical pages in a flash memory module is 2 to the 32nd power. In accordance with this, 4 Bytes of information is needed in the association of a logical page 403 and a physical page 305 in the first comparative example. Alternatively, when the number of physical pages in a physical chunk 1005 is limited to equal to or less than 2 to the 16th power in the second comparative example, 2 Bytes of information are all that is needed in the association of the logical page 403.

This second comparative example partitions the logical address space for the purpose of reducing the management information, and may introduce a logical chunk 1002 for simplifying the control structure.

However, in a case where the allocation of a logical page 403 to a logical chunk 1002 is fixed, for example, in the case of the example of FIG. 10, a logical page 403 with an LBA range of 0x00 through 0x0F is disposed in the physical chunk #0 so as to belong to the logical chunk #0 at all times. For this reason, for example, a case in which I/O requests are concentrated on the logical chunk #0 and hardly any I/O requests go to the logical chunk #100, variations also appear in the utilization of the physical resources.

(Logical-Physical Translation Information of Mode for the Invention 1)

The logical-physical translation information 206 of this mode for the invention will be explained below.

The logical-physical translation information 206 of this mode for the invention comprises a changeable configuration for an association between a logical page 403 and a logical chunk 1002. This makes it possible to reduce the variations in access to multiple physical resources.

Figure 11:
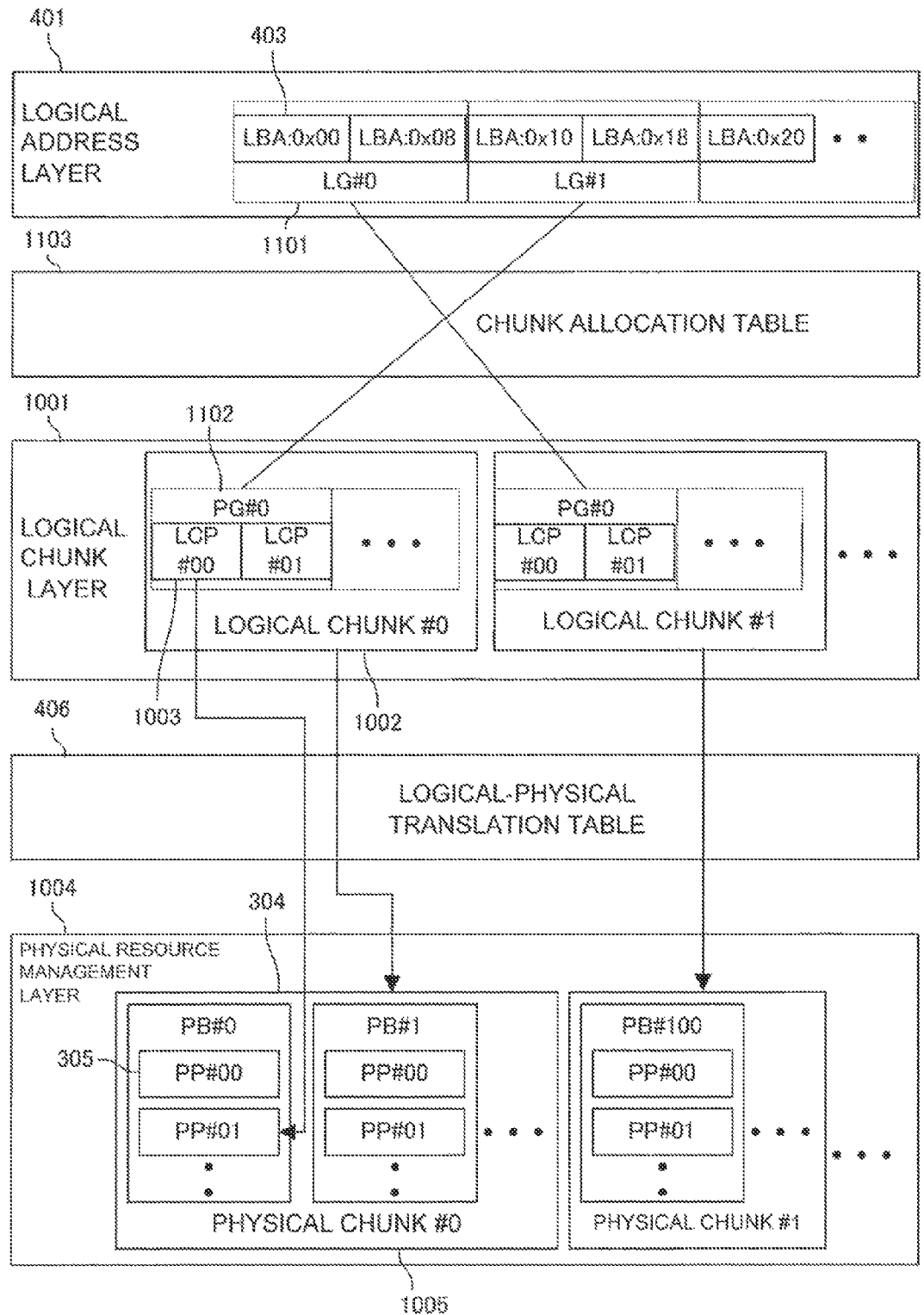
FIG. 11 shows logical-physical translation information of a first mode for the invention.

FIG. 11 shows the logical-physical translation information 206 of the first mode for the invention. Compared to the logical-physical translation information 206 of the second comparative example, the logical-physical translation information 206 of this mode for the invention further comprises a chunk allocation table 1103, which shows the relationship between the logical address layer 401 and the logical chunk layer 1001. The chunk allocation table 1103 shows the association between a logical page 403 defined by the logical address layer 401 and a logical chunk 1002 defined by the logical chunk layer 1001.

The logical address layer 401 defines multiple LBA groups (LG) 1101. The multiple LBA groups 1101 are multiple address spaces obtained by partitioning a logical address space on a logical volume, and a LBA group 1101 is a smaller address space than a logical chunk 1002. The LBA group 1101 comprises multiple logical pages 403. The logical page 403 comprises a range of LBAs, and, for example, is indicated by a start LBA. There are no constraints on the number of logical pages included in a LBA group 1101, and a LBA group 1101 may comprise any number of pages. However, in the logical-physical translation information 206 of this mode for the invention, it is preferable that the number of pages belonging to one LBA group 1101 be fixed for ease of management. In this mode for the invention, it is supposed that one LBA group 1101 denotes two logical pages 403.

A logical chunk 1002 in this mode for the invention comprises multiple page groups (PG) 1102. The page group 1102 is a slot, which can be allocated to a LBA group 1101. The chunk allocation table 1103 shows the association between a page group 1102 and a LBA group 1101. The page group 1102 comprises multiple LC pages 1003. The LBA group 1101 is associated with one page group 1102. Therefore, the number of LC pages 1003 in one page group 1102 is equivalent to the number of logical pages 403 in one LBA group 1101.

Each LBA group 1101 is indicated by a LBA group number, such as #0, #1, and so forth. Each logical page 403 in the LBA group 1101 is indicated by a start LBA, such as 0x00, 0x08, and so forth. Each page group 1102 in a logical chunk 1002 is indicated by a page group number, such as #0, #1, and so forth. Each LC page 1003 in the page group 1102 is indicated by a LC page number, such as #00, #01, and so forth.

The sequence of the LC page numbers disposed in the page group 1102 corresponds to the sequence of the start LBAs disposed in the LBA group 1101. Furthermore, in this mode for the invention, each logical page 403 in the LBA group 1101 is indicated by a start LBA, such as 0x00, 0x08, and so forth, but may be indicated by a logical page number, such as #0, #1, and so forth. In accordance with this, the logical page number of each logical page 403 in the LBA group 1101 coincides with the LC page number of each LC page 1003 in the allocated page group 1102. Therefore, by allocating an LBA group 1101 to a page group 1102, multiple logical pages 403 in the LBA group 1101 are respectively allocated to multiple LC pages 1003 in the page group 1102.

In this mode for the invention, the LBA group #0 is allocated to page group #0 in the logical chunk #1. In accordance with this, the logical pages 0x00 and 0x08 in the LBA group #0 are respectively allocated to the LC pages #00 and #01 in the page group #0 in the logical chunk #1. Similarly, the group #1 is allocated to the page group #0 in the logical chunk #0. In accordance with this, the logical pages 0x10 and 0x18 in the LBA group #1 are respectively allocated to the LC pages #00 and #01 in the page group #0 in the logical chunk #0.

According to the chunk allocation table 1103, the association between the logical chunk 1002 and the logical page 403 can be flexibly changed. The granularity thereof depends on the size of the LBA group 1101. In this case, the LBA group 1101 may be the same as the logical page 403. In such a case the chunk allocation table 1103 will become about the same size as the logical-physical translation table 406 of the first mode for the invention.

(Allocation Destination Change Process)

An allocation destination change process for changing the allocation-destination page group 1102 of a certain LBA group 1101 will be explained hereinbelow. That is, the allocation destination change process migrates a certain LBA group 1101 from a prechange page group 1102 to a postchange page group 1102.

The logical-physical translation program 205 performs the allocation destination change process based on the state of a physical resource, such as the flash memory chip 301. The state of the physical resource, for example, is the load of each LBA group 1101, the load of each logical chunk 1002, the load of each physical chunk 1005, and the load of each physical block 304.

Figure 12:
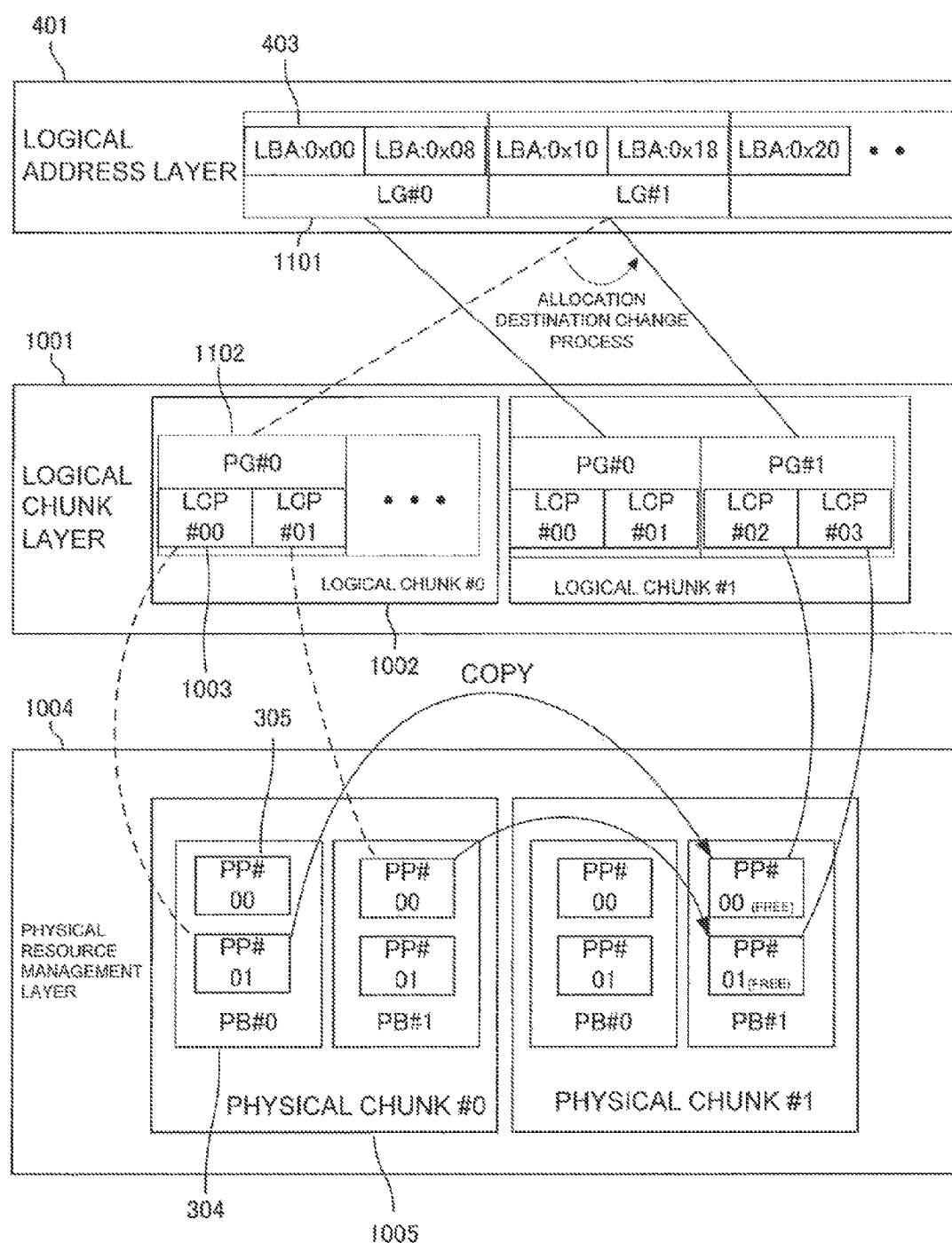
FIG. 12 shows an example of an allocation destination change process.

FIG. 12 shows an example of the allocation destination change process. First, it is supposed that the LBA group #1 is allocated to the page group #0 of the logical chunk #0, and that a LBA group 1101 is not allocated to the page group #1 of the logical chunk #1. A case in which the logical-physical translation program 205 changes the allocation destination of the LBA group #1 to the page group #1 of the logical chunk #1 will be explained at this time.

The logical-physical translation program 205 rewrites the chunk allocation table 1103 to change the allocation-destination logical chunk 1002 and page group 1102 of the LBA group #1. Since the logical chunks #0 and #1 are using respectively different physical chunks #0 and #1 at this time, the logical-physical translation program 205 copies the data of the LBA group #1 stored in the physical chunk #0 to the physical chunk #1.

The copy sources at this time are the physical page #01 in the physical block #0 and the physical page #00 in the physical block #1 of the physical chunk #0. Prior to the allocation destination change process, the LBA group #1 is associated with the copy sources. In addition, it is supposed that the logical-physical translation program 205 selects as the copy destination physical pages #00 and #01 of the physical block #1, which are the free pages in the physical chunk #1. The logical-physical translation program 205 copies the data stored in the copy sources to the copy destinations at this time. In addition, the logical-physical translation program 205 associates the LC pages #02 and #03 in the page group #1 of the new allocation-destination logical chunk #1 of the LBA group #1 with the physical pages #00 and #01 of the physical block #1 of the physical chunk #1, which is the copy destination.

According to the above-described allocation destination change process, the LBA group #1 data stored in the physical chunk #0 is copied to the physical chunk #1, and the LBA group #1 is associated with the logical chunk #1.

The changing of the state of the chunk allocation table 1103 in the allocation destination change process will be explained below.

FIG. 13 shows a first state of the chunk allocation table 1103. This first state is the state prior to the allocation destination change process. The chunk allocation table 1103 comprises an entry for each page group 1102. Each entry comprises a logical chunk number 1301, a page group number 1302, an attribute 1303, a LBA group number 1304, a copy-destination chunk number 1305, and a copy-destination page group number 1306.

The logical chunk number 1301 shows the logical chunk 1002 to which the page group 1102 of this entry belongs. The page group number 1302 shows the relevant page group 1102. An attribute 1303 shows the attribute of the relevant page group 1102. The LBA group number 1304 shows the LBA group 1101, which is allocated to the relevant page group 1102. The copy-destination chunk number 1305 shows the copy-destination chunk, which is the copy-destination logical chunk 1002 in a case where the data of the relevant page group 1102 is to be copied to another page group 1102. The copy-destination page group number 1306 shows the copy-destination page group 1102 in a case where the data of the relevant page group 1102 is to be copied to another page group 1102.

The attribute 1303 shows whether or not LBA group 1101 is allocated to the relevant page group 1102. In this first state, since the LBA group #1 is allocated to the page group #0 of the logical chunk #0, the value 1303a of the attribute 1303 is "allocated". In addition, the value 1304a of the LBA group number 1304 of the page group #0 of the logical chunk #0 shows that the LBA group #1 is allocated to the relevant page group 1102. Since a LBA group 1101 is not allocated to the page group #1 of the logical chunk #1, the value 1303b of the attribute 1303 is "free". In the following explanation, a page group 1102 to which a LBA group 1101 has not been allocated like this will be called a free page group.

The copy-destination chunk number 1305 becomes valid at the time of an allocation destination change process with respect to the LBA group 1101 allocated to the relevant page group 1102. The same holds true for the copy-destination page group number 1306.

FIG. 14 shows a second state of the chunk allocation table 1103. This second state is the state at the time of the start of the allocation destination change process. At this point, the logical-physical translation program 205 makes the LBA group #1 allocated to the page group #0 of the logical chunk #0 the copy source, and starts copying the data from the copy source to the copy destination. The logical-physical translation program 205 selects the page group #1 of the logical chunk #1 as the copy destination at this time. In accordance with this, the logical-physical translation program 205 manages the chunk allocation table 1103 by writing the copy-destination information to the copy-destination chunk number 1305 value 1305a and the copy-destination page group number 1306 value 1306a for the copy-source page group 1102. The logical-physical translation program 205 also respectively changes the values 1303a and 1303b of the attribute 1303 for the copy-source and the copy-destination page groups 11102 to "migration in process" to show that a copy is being executed. When changing a value of the chunk allocation table 1103, the logical-physical translation program 205 also copies the data of the LISA group #1 from the physical page 305 in which this data is stored to a physical page 305 under the management of the logical chunk #1.

It is inefficient for the logical-physical translation program 205 to search all of the page groups 1102 to acquire a free page group. Consequently, the logical-physical translation program 205 may manage free page groups using a structure such as a queue. This free group management method is not limited to this mode for the invention.

FIG. 15 shows a third state of the chunk allocation table 1103. This third state is the state in which the data copy in accordance with the allocation destination change process has been completed. The logical-physical translation program 205 changes the value 1303a of the attribute 1303 to "free" because the page group #0 of the copy-source logical chunk #0 has transitioned to a free page group. In addition, the logical-physical translation program 205 changes the value 1304b of the corresponding LBA group number 1304 to "none". Since the copying has been completed, the logical-physical translation program 205 also clears the values 1305a and 1306a of the copy-destination chunk number 1305 and the copy-destination page group number 1306.

Furthermore, since a new LBA group #1 has been allocated to the page group #1 of the copy-destination logical chunk #1, the logical-physical translation program 205 changes the value 1303b of the attribute 1303 to "allocated" and changes the value 1304b of the LBA group number 1304 to "1", thereby associating the page group #1 of the logical chunk #1 with the LBA group #1. Furthermore, since the copying has been completed, the logical-physical translation program 205 clears the value 1305a of the copy-destination chunk number 1305 and the value 1306a of the copy-destination page group number 1306 for the copy-source page group 1102. The logical-physical translation program 205 also clears the value 1304a of the LBA group number 1304 for the copy-source page group 1102.

Furthermore, because the copy-destination chunk number 1305 and the copy-destination page group number 1306 are items, which temporarily become valid for each page group 1102, there is no need to allocate a fixed item to each page group 1102. In a case where constraints on the size of the management information are particularly tough, the management information can be reduced by limiting the number of page groups capable of simultaneously undergoing allocation destination change processing and managing copy-related information using another migration management table. In a case where the attribute 1303 for each page group 1102 is "migration in progress", the logical-physical translation program 205, for example, can reference this migration management table using a hash or other such method. The method for managing this copy-related information is not limited to this mode for the invention.

To facilitate the explanation, the chunk allocation table 1103 employs a data structure, which makes the logical chunk number 1301 and the page group number 1302 the keys to an entry, but in contrast to this, there may be case where a data structure that makes the LBA group number 1304 the entry key is better at the time of implementation. The chunk allocation table 1103 may also comprise both of these data structures. These data structures are not limited to this mode for the invention.

A write process during the allocation destination change process will be explained below.

Figure 16:
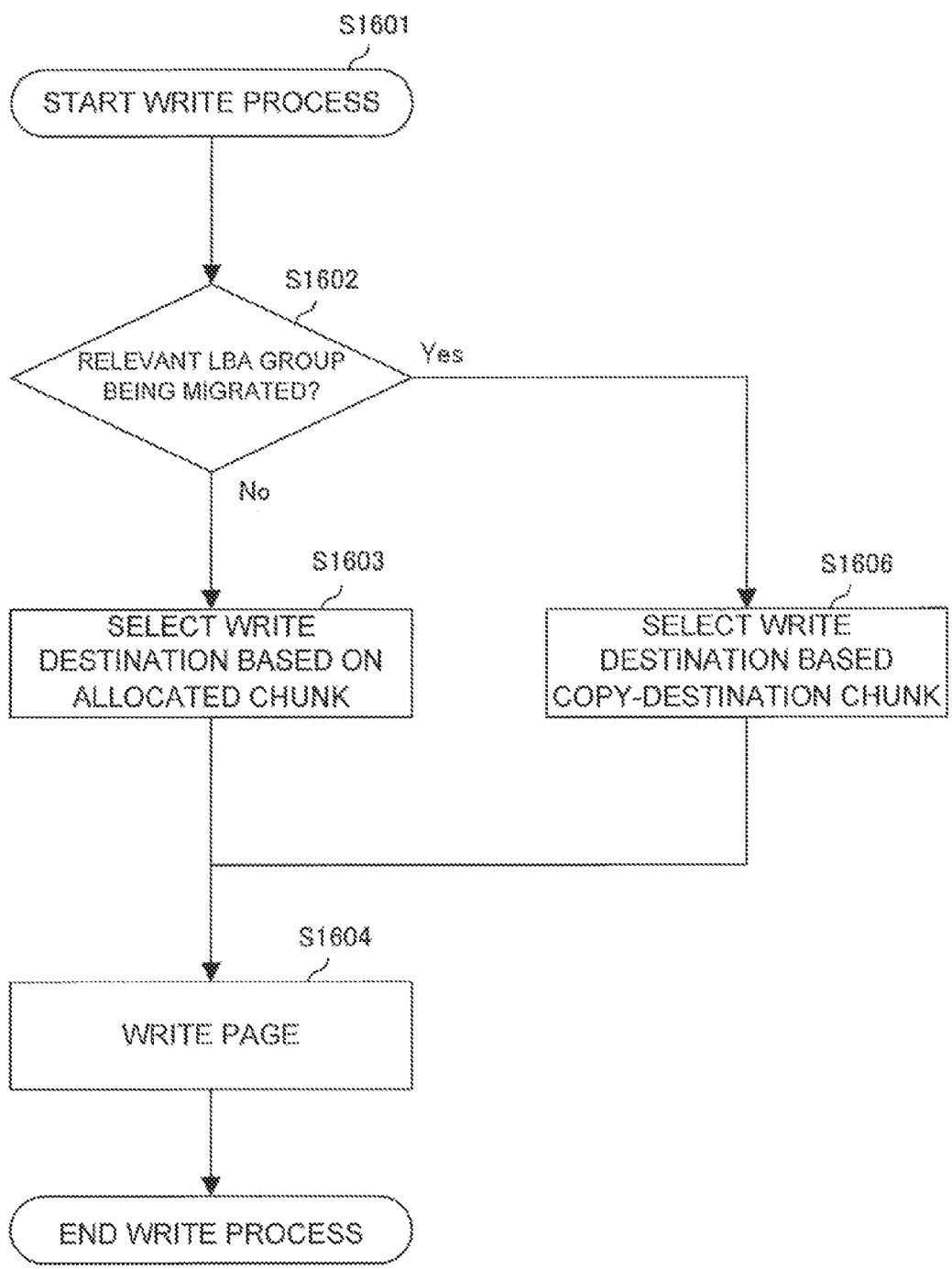
FIG. 16 shows a write process within an allocation destination change process.

FIG. 16 shows a write process during the allocation destination change process. The logical-physical translation program 205, upon receiving a write request from the host 110 during the allocation destination change process and starting the write process (S1601), identifies a target LBA group, which is the write-target LISA group 1101, and determines whether or not the target LISA group is being migrated (S1602). In a case where the attribute 1303 of the page group 1102 associated with the target LBA group is "migration in progress" here, that is, in a case in which the data of the target LBA group is being copied, the logical-physical translation program 205 determines that the target LBA group is in the process of being migrated.

In a case where it has been determined that the target LBA group is not in the process of being migrated (S1602: No), the same as in a normal write, the logical-physical translation program 205 selects a write-destination physical page, which is the write-target physical page 305, from the physical chunk 1005 corresponding to the allocated chunk, which is the currently allocated logical chunk 1002 (S1603), executes the write (page write) to the write-destination physical page (S1604), and ends this flow.

In a case where it has been determined that the target LBA group 1101 is in the process of being migrated (S1602: Yes), the logical-physical translation program 205 selects the write-destination physical page from the physical chunk 1005 conesponding to the copy-destination chunk, which is the copy-destination logical chunk 1002 (S1606). In so doing, the logical-physical translation program 205 performs command sequence control as well as exclusive control so that the write sequence is not corrupted. A case where the write sequence becomes corrupted, for example, is one in which a copy is executed in accordance with the allocation destination change process and a rewrite resulting from the old data occurs after this write process has been executed. Consequently, the logical-physical translation program 205, for example, performs an atomic write relative to a flag corresponding to the write-destination physical page, and suspends the write process while this flag is ON. In a case where the validity of the write process has been guaranteed using exclusive control and sequence control, the logical-physical translation program 205 performs the processing the same as for a normal write process.

The preceding is the flow of write processing during an allocation destination change process.

In a read process, the logical-physical translation program 205 discerns whether the latest data is at the copy source or at the copy destination during the copying in accordance with the allocation destination change process, and performs the read from the discerned location. In this case, the logical-physical translation program 205 can realize the read by using the above-mentioned exclusive control.

(Relationship Between Logical Storage Area and Updated Area)

The relationship between a logical storage area and an updated area will be explained below.

In the following explanation, in a physical storage area capable of being used by a certain logical storage area, a physical storage area for storing an updated data of this logical storage area will be called an updated area. Furthermore, the ratio of the size of the updated area relative to the size of the physical storage area capable of being used by the certain logical storage area will be called the update area ratio.

The relationship between the logical storage area and the updated area in the first comparative example will be explained here.

Figure 17:
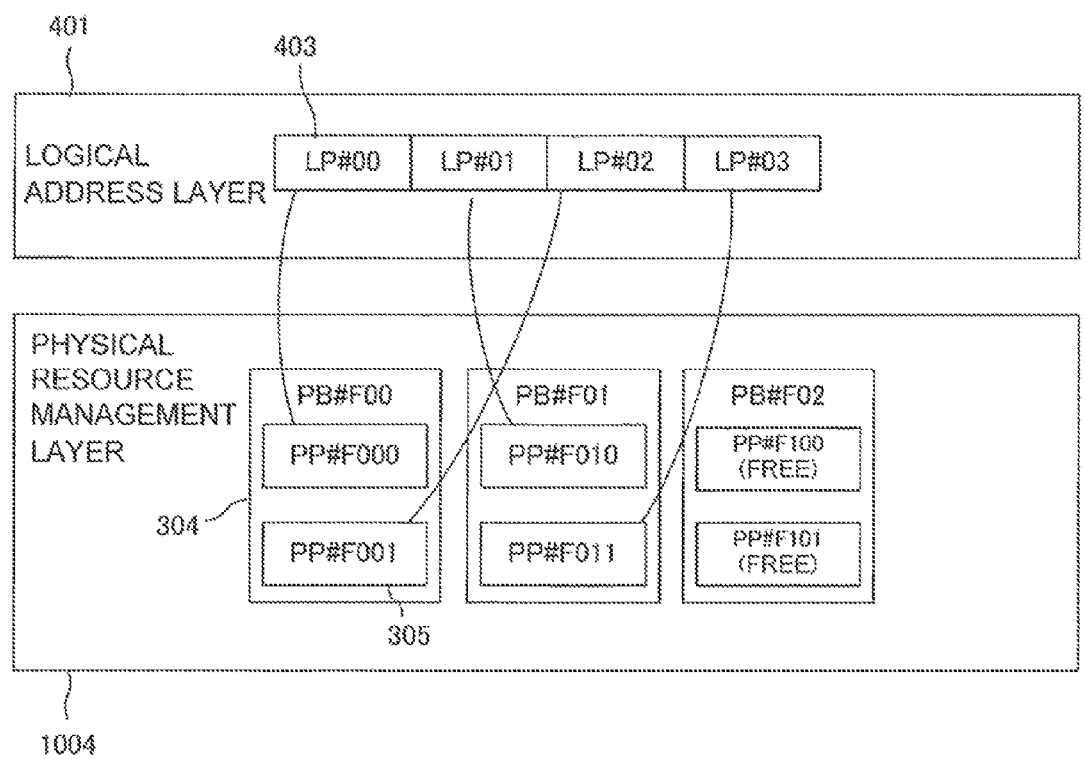
FIG. 17 shows an example of logical-physical translation information in the first comparative example.

FIG. 17 shows an example of the logical-physical translation information 206 in the first comparative example. Ordinarily, the number of physical pages 305 is larger than the number of logical pages 403. This is because, when an update occurs with respect to a certain logical page 403, this updated data is written to another free page of the physical pages 305 associated with the logical page 403. In this mode for the invention, the logical address layer 401 defines the four logical pages #00, #01, #02, and #03, and the physical resource management layer 1004 defines the three physical blocks #F00, #F01, and #F02. The physical block #F00 comprises the two physical pages #F000 and #F001. The physical block #F01 comprises the two physical pages #F010 and #F011. The physical block #F02 comprises the two physical pages #F100 and #F101. The logical pages #00, #01, #02, and #03 are respectively associated with the physical pages #F000, #F010, #F001, and #F011. The physical pages #F100 and #F101 of the physical block #F02 are free pages.

In a case where the logical page #00 has been updated here, the updated data is written to the free page #F100 of the physical block #F02, the logical-physical translation table 406 is updated, and an invalid flag is set up in the source physical page #F000. That is, the logical address layer 401 comprises four logical pages 403, and the physical resource management layer 1004 comprises six physical pages 305, Therefore, the ratio of the size of the logical storage area (number of logical pages) and the size of the physical storage area (number of physical pages) 4:6. The update area ratio is this case is 1/3.

Making free block creation more efficient can be realized by reducing the amount cif internal copying in a reclamation, and, for example, can be realized by raising the update area ratio.

The relationship between a logical storage area and an update area in the second comparative example will be explained here.

Figure 18:
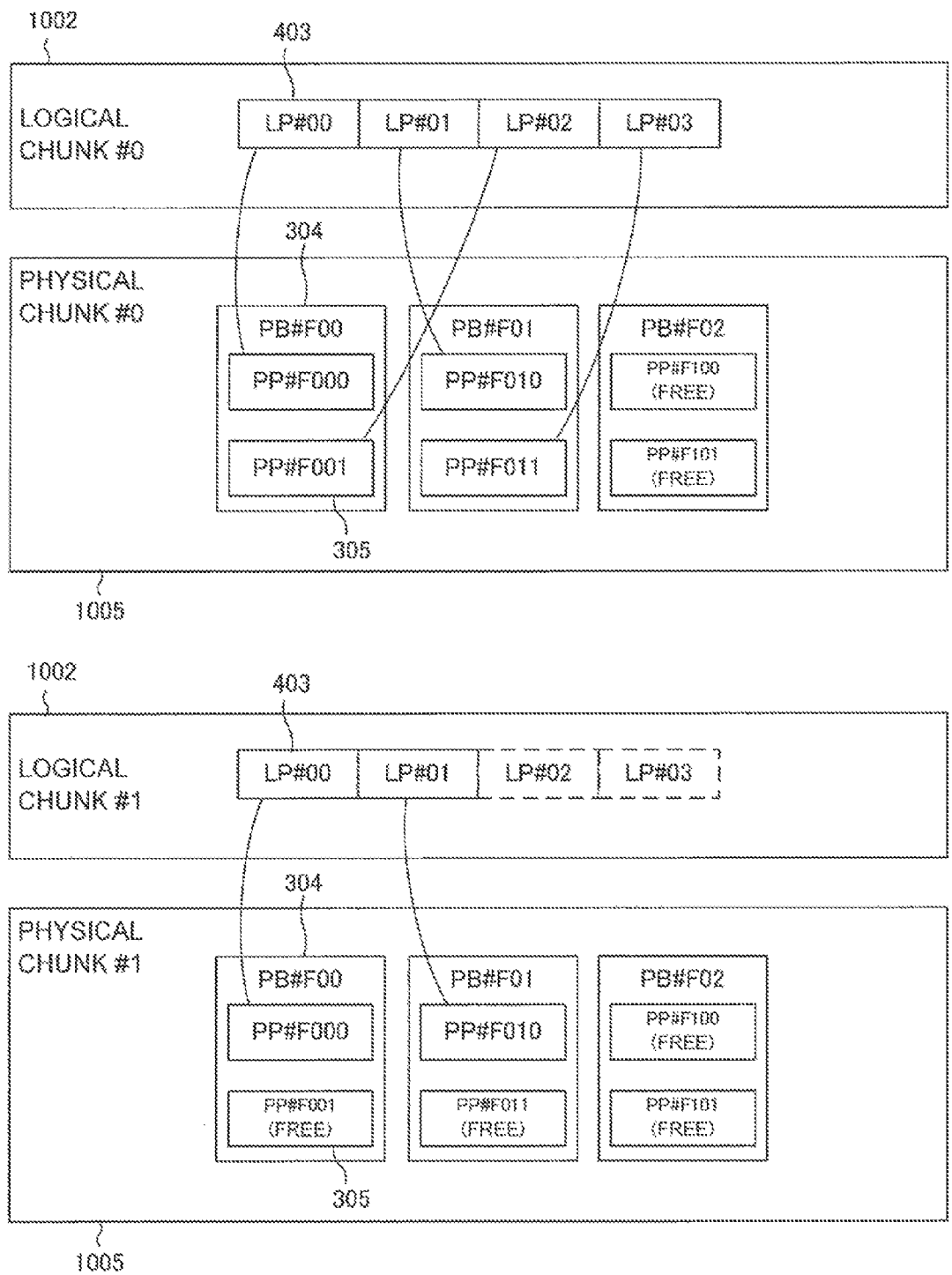
FIG. 18 shows an example of logical-physical translation information in the second comparative example.

FIG. 18 shows an example of the logical-physical translation information 206 in the second comparative example. The logical chunk #0 comprises the four logical pages #00, #01, #02 and #03. The physical chunk #0 associated with the logical chunk #0 comprises the three physical blocks #F00, #F01, and #F02. The physical block #F00 comprises the two physical pages #F000 and #F001. The physical block #F01 comprises the two physical pages #F010 and #F011. The physical block #F02 comprises the two physical pages #F100 and #F101. That is, the logical chunk #0 comprises four logical pages 403, and the physical chunk #0 associated therewith comprises six physical pages 305. Therefore, the ratio of the size of the logical storage area and the size of the physical storage area in the association of the logical chunk #0 with the physical chunk #0 is 4:6.

Alternatively, the logical chunk #1 comprises the two logical pages #00 and #01. The physical chunk #1 associated with the logical chunk #1 comprises the three physical blocks #F00, #F01, and #F02. The physical block #F00 comprises the two physical pages #F000 and #F001. The physical block #F01 comprises the two physical pages #F010 and #F011. The physical block #F02 comprises the two physical pages #F100 and #F101. That is, the logical chunk #1 comprises two logical pages 403, and the physical chunk #1 associated therewith comprises six physical pages 305. Therefore, the ratio of the size of the logical storage area and the size of the physical storage area in the association of the logical chunk #1 with the physical chunk #1 is 2:6.

In this mode for the invention, since the update area ratio of the logical chunk #1 is higher than the update area ratio of the logical chunk #0, in a case where the same I/O request is executed in the logical chunk #0 and the logical chunk #1, logical chunk #1 can more efficiently create a free block.

(Allocation Destination Change Process Based on Load Measurement)

An allocation destination change process based on measuring a load will be explained below.

In a case where a physical chunk 1005 allocated to a logical chunk 1002 is fixed, variations in physical resource load and physical resource utilization rates may occur between multiple physical chunks 1005. Consequently, the logical-physical translation program 205 can realize physical resource load balancing and effective use of the physical resources by executing an allocation destination change process in accordance with the load of each LBA group 1101.

In this mode for the invention, the logical-physical translation program 205 performs the allocation destination change process using the write frequency of each LBA group 1101. There is a limitation on the number of LBA groups 1101 capable of being allocated to the logical chunk 1002. The logical-physical translation program 205 makes the values of the number of allocatable LBA groups 1101 differ from one another for multiple logical chunks 1002. In accordance with this, the logical-physical translation program 205 allocates a LBA group 1101 with a write frequency that is higher than a criterion to a logical chunk 1002 for which the number of allocatable LBA groups is lower than a criterion, and allocates a LBA group 1101 with a write frequency that is lower than the criterion to a logical chunk 1002 for which the number of allocatable LBA groups is higher than the criterion. This makes it possible to allocate a relatively larger number of physical resources to a high write-frequency LBA group 1101 than to another LBA group 1101, enabling the enhancement of flash memory module performance. In other words, the logical-physical translation program 205 optimizes the update area ratio by allocating logical chunks 1002 with different write frequencies, and changing the upper limit of the number of associated physical pages.

FIG. 19 shows a write frequency management table 1900. The write frequency management table 1900 comprises an entry for each LBA group 1101, and manages the write frequency of each LBA group 1101. Each entry comprises a LBA group number 1901, a logical chunk number 1902, a page group number 1903, and a write frequency 1904.

The LBA group number 1901 is an entry key, and shows the LBA group 1101 of this entry. The logical chunk number 1902 shows the logical chunk 1002 to which the relevant LBA group 1101 is currently allocated. The page group number 1903 shows the page group 1102 to which the relevant LBA group 1101 is currently allocated. The write frequency 1904, for example, shows the range to which a measurement value of the relevant LBA group 1101 belongs from among multiple ranges of measurement values showing the write frequency.

In this mode for the invention, a three-stage value (high, medium, low) is defined for the write frequency 1904. The method for expressing the write frequency is not limited to this mode for the invention, and may be expressed as a relative value or as an absolute value. For example, the logical-physical translation program 205 may count the number of writes to the relevant LBA group 1101, compute an average value of the number of writes to all the LBA groups 1101, and assess the write frequency of a target LBA group by comparing the number of writes to the target LBA group with the average value of the number of writes to all the LBA groups 11101. In accordance with this, the logical-physical translation program 205 may use the average value as a threshold showing the boundary between ranges of numbers of writes for determining the write frequency 1904, and may provide a number of thresholds between the maximum number of writes and the minimum number of writes in all the LBA groups 1101.

The logical-physical translation program 205 performs the allocation destination change process for changing the allocation-destination logical chunk 1002 of an LBA group 1101 in accordance with the number of writes of the LBA group 1101.

The logical-physical translation program 205 may also create a write frequency management table 1900 in accordance with an instruction from a user. In this case, the user can configure a high write frequency for a specific LBA group 11011 in advance.

FIG. 20 shows a chunk attribute table 2000. The chunk attribute table 2000 manages the attribute of each logical chunk 1002. The chunk attribute table 2000 comprises an entry for each logical chunk 1002, and manages the attribute of each logical chunk 1002. Each entry comprises a logical chunk number 2001, an attribute 2002, and a maximum number of allocatable groups 2003. The logical chunk number 2001 is the key to an entry, and shows the logical chunk 1002 of this entry. The attribute 2002 shows the attribute of the data stored in the relevant logical chunk 1002. The maximum number of allocatable groups 2003 shows the number of page groups 1102 in the relevant logical chunk 1002. That is, the maximum number of allocatable groups 2003 shows the maximum value of the number of LBA groups 1101 capable of being allocated to the relevant logical chunk 1002.

A two-stage value (hot and cold) is defined for the attribute 2002. Hot shows that the write frequency of the data stored in the relevant logical chunk 1002 is higher than a preconfigured criterion. For example, a LBA group 1101, which has a write frequency 1904 of "high" in the write frequency management table 1900, is allocated to a page group 1102 in a logical chunk 1002, which has an attribute 2002 of "hot". Cold shows that the write frequency of the data stored in the relevant logical chunk 1002 is lower than a preconfigured criterion. For example, a LBA group 1101, which has a write frequency 1904 of either "medium" or "low" in the write frequency management table 1900, is allocated to a page group 1102 in a logical chunk 1002, which has an attribute 2002 of "cold". The maximum number of allocatable groups 2003 shows the maximum number of LBA groups capable of being allocated to the relevant logical chunk 1002. That is, by limiting the maximum number of allocatable groups 2003, it is possible to enhance the update area ratio for the relevant logical chunk 1002. In particular, the maximum number of allocatable groups 2003 of a data-storing logical chunk 1002 with an attribute 2002 of hot is configured lower than another logical chunk 1002.

The upper limit of the maximum number of allocatable groups 2003 may be configured beforehand. For example, the upper limit of the maximum number of allocatable groups 2003 is decided such that the number of logical pages included in a certain logical chunk 1002 is smaller than the number of physical pages of the physical chunk 1005 corresponding to this logical chunk 1002. The lower limit of the maximum number of allocatable groups 2003 may also be configured beforehand. When reducing the maximum number of allocatable groups 2003 of a certain logical chunk 1002, the reduced number of LBA groups 1101 is allocated to another logical chunk 1002. Therefore, for example, the lower limit of the maximum number of allocatable groups 2003 of a certain logical chunk 1002 is decided in accordance with the upper limit of the maximum number of allocatable groups 2003 of another logical chunk 1002. The ratio between the maximum number of allocatable groups 2003 of the certain logical chunk 1002 and the maximum number of allocatable groups 2003 of the other logical chunk 1002 may be configured beforehand. This ratio, for example, is configured as two-fold.

The setting values in the chunk attribute table 2000 may be configured beforehand, or may be dynamically changed using the logical-physical translation program 205. For example, the logical-physical translation program 205, in a case where there is a particular bias in the I/O frequencies between multiple logical chunks 1002, can elevate the effect further by configuring a larger difference in the maximum number of allocatable groups 2003 between the multiple logical chunks 1002.

A write process comprising an allocation destination change process will be explained below.

Figure 21:
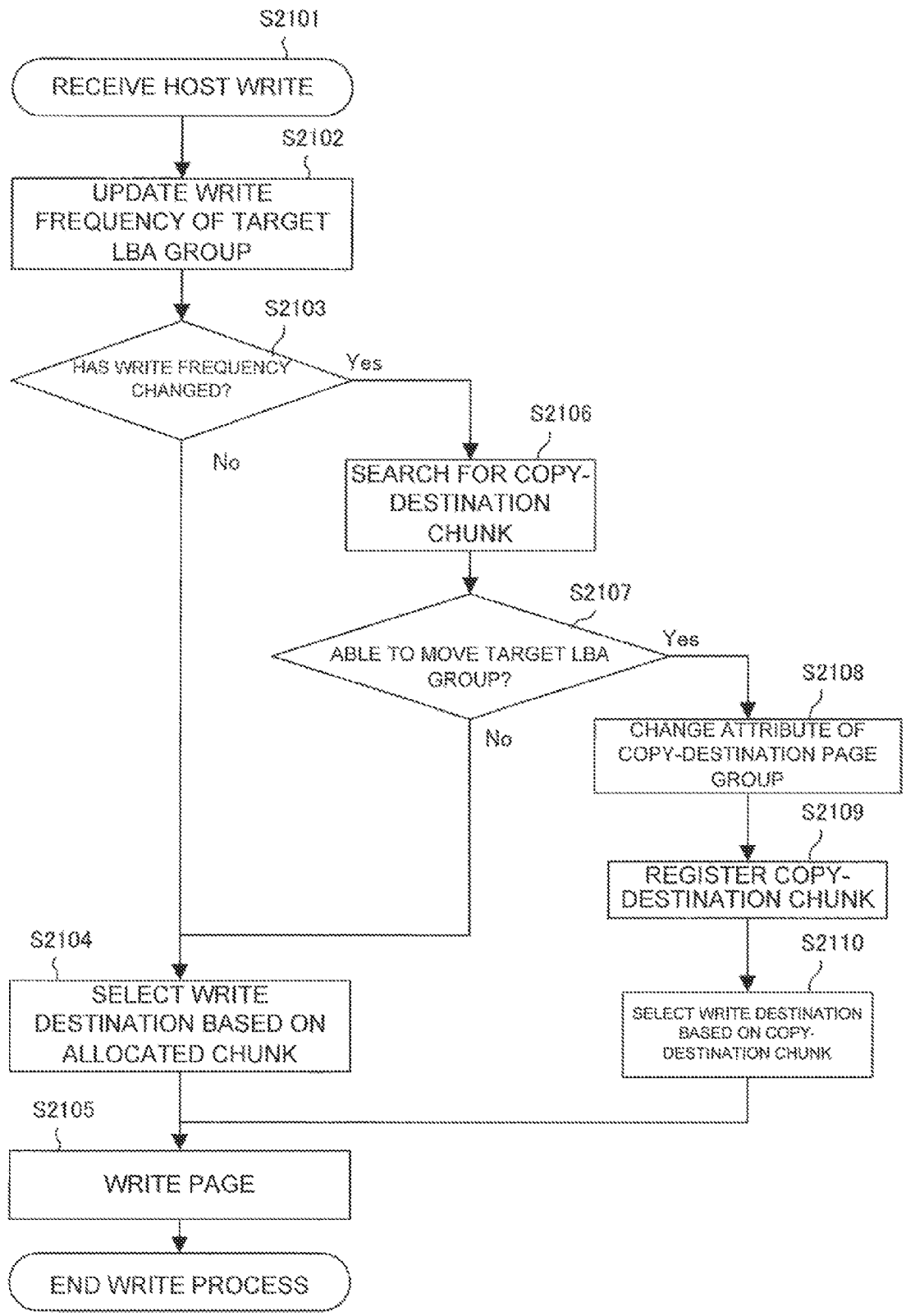
FIG. 21 shows a write process comprising an allocation destination change process.

FIG. 21 shows a write process comprising an allocation destination change process.

The logical-physical translation program 205, upon receiving a write request from the host 110, starts a write process (S2101). The logical-physical translation program 205 identifies a target LBA group, which is the write-target LBA group 1101, on the basis of the write request, references the write frequency management table 1900, computes the write frequency 1904 of the target LBA group, and updates the write frequency management table 1900 (S2102). Next, the logical-physical translation program 205 determines whether or not the write frequency 1904 of the target LBA group has changed (S2103).

In a case where the target LBA group write frequency 1904 has not changed (S2103: No), the logical-physical translation program 205 selects a write-destination physical page from the physical chunk 1005 corresponding to the allocated logical chunk without changing the allocated logical chunk, which is the logical chunk 1002 to which the target LBA group is allocated (S2104), executes a write (page write) to the write-destination physical page (S2105), and ends this flow.

Alternatively, in a case where the target LBA group write frequency 1904 has changed (S2103: Yes), the logical-physical translation program 205 searches for a copy-destination chunk, which is the copy-destination logical chunk 1002 of the target LBA group (S2106). For example, the logical-physical translation program 205 manages the write frequency management table 1900 using a write frequency 1904 sorted queue, identifies another LBA group 1101 comprising a post-change write frequency 1904 in the write frequency management table 1900, and selects the logical chunk 1002 to which the identified LBA group 1101 is allocated as the copy-destination chunk.

Based on the result of the search, the logical-physical translation program 205 determines whether or not the target LEA group can be migrated (S2107). For example, in a case where allocating the target LBA group to another logical chunk 1002 will exceed the maximum number of allocatable groups 2003, or a case where the target LBA group is unable to be migrated due to the fact that another LBA group 1101 is in the process of being migrated, the logical-physical translation program 205 determines that the target LBA group cannot be migrated. In a case where it has been determined that the target LBA group cannot be migrated (S2107: No), the logical-physical translation program 205 may move the processing to S2104, select a write-destination physical page from the currently allocated logical chunk 1002 for this write, and perform a target LBA group migration at the next and subsequent writes. Or, the logical-physical translation program 205 may reserve the target LBA group migration in this write, and start this migration after this migration becomes executable.

In a case where a copy-destination chunk is detected as a result of the search, and a determination is made that the target LBA group can be migrated (S2107: Yes), the logical-physical translation program 205 performs allocation destination change processing (S2108 through S2110) for the target LBA group. First, the logical-physical translation program 205 identifies a copy-destination page group, which is a free page group in the detected copy-destination chunk, in the chunk allocation table 1103, and changes the attribute 1303 of the copy-destination page group from "free" to "allocated" (S2108). Next, the logical-physical translation program 205 identifies an allocated page group, which is a page group 1102 to which the target LBA group is allocated, from among the allocated chunks in the chunk allocation table 1103, and respectively registers the copy-destination chunk and copy-destination page group in the copy-destination chunk number 1305 and the copy-destination page group number 1306 of the allocated page group (S2109). Next, the logical-physical translation program 205 selects a write-destination physical page from the physical chunk 1005 corresponding to the copy-destination chunk and the copy-destination page group (S2110), and moves the processing to S2105.

The preceding is the flow of a write process comprising an allocation destination change process.

In a case where the write frequency of a certain LBA group 1101 is higher than a preconfigured write frequency criterion, the logical-physical translation program 205 may identify a logical chunk 1002 comprising a maximum number of allocatable groups, which is lower than a preconfigured criterion for the maximum number of allocatable groups, and associate the relevant LBA group 1101 with a page group 1102 in the identified logical chunk 1002.

The logical-physical translation program 205 may measure the load of each physical resource, such as the amount of write data of each physical resource and the write history of each physical resource, and execute the allocation destination change process on the basis of the measurement result.

According to this allocation destination change process, the load balancing and effective use of the physical resources can be realized by changing the allocation-destination logical chunk 1002 of the LBA group 1101 in accordance with the write frequency of each LBA group 1101 even when a physical block 304 belonging to a physical chunk 1005 is fixed.

Furthermore, the flash memory chip 301 may change the physical block 304 belonging to the physical chunk 1005 in order to balance the load and make effective use of the physical resources.

Mode for the Invention 2

The flash memory control apparatus 101 of this mode for the invention uses exclusivity between logical chunks 1002 and configures a different policy for each logical chunk 1002.

The configuration of the flash memory module of this mode for the invention is the same as that of the first mode for the invention. Since an independent physical resource is associated with each logical chunk 1002, the flash memory control apparatus 101 can guarantee that I/O requests to different logical chunks do not interfere with one another. The flash memory control apparatus 101 of this mode for the invention makes use of this characteristic to perform priority control with respect to an identified logical address. That is, the flash memory control apparatus 101 of this mode for the invention does not have to perform exclusive control with respect to an I/O request to different logical chunks 1002.

Figure 22:
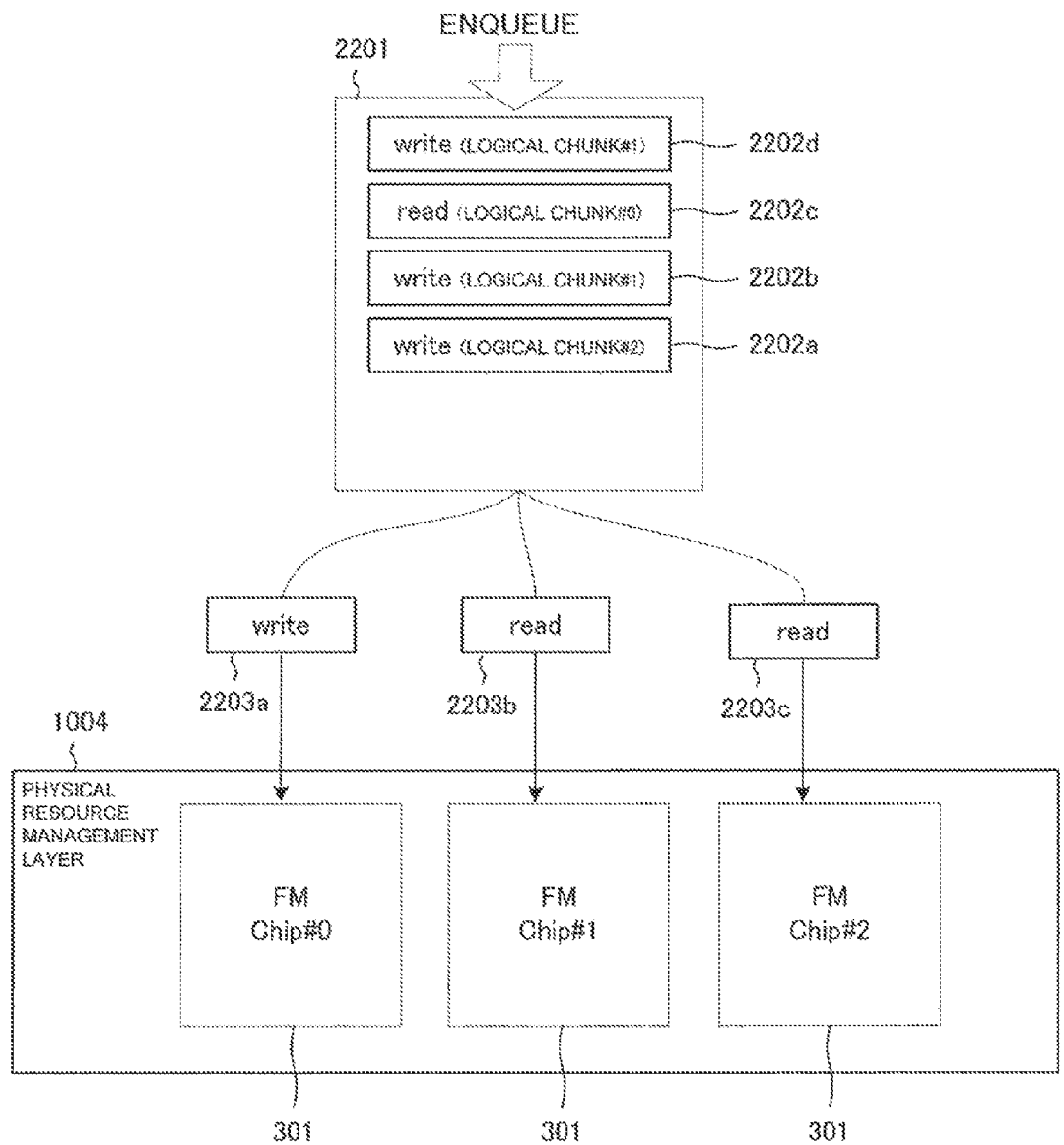
FIG. 22 shows an example of a command queue.

FIG. 22 shows an example of a command queue 2201. Commands 2202a through 2202d are either commands, which the flash memory control apparatus 101 has received from the host 110, or commands, which the flash memory control apparatus 101 itself has created for reclamation. Commands 2202a, 2202h, 2202c, and 2202d are stored in enqueued sequence in the command queue 2201. The commands 2202a, 2202h, 2202c, and 2202d, respectively, are a write command with respect to the logical chunk #2, a write command with respect to the logical chunk #1, a read command with respect to the logical chunk #0, and a write command with respect to the logical chunk #1. In addition, it is supposed that the logical chunks #0, #1, and #2 are respectively associated with the flash memory chips #0, #1, and #2. That is, logical chunks 1002, which differ from one another, are associated with physical resources, which differ from one another.

These commands are booted up in the sequence in which they were enqueued in the command queue 2201, and the content of a command is executed with respect to a flash memory chip 301. In this mode for the invention, since the commands 2203a, 22031, and 2203c from the command queue 2201 are commands for the mutually different flash memory chips #0, #1, and #2, these commands can be executed simultaneously in parallel. The number of commands capable of being executed simultaneously in parallel is constrained in accordance with either the packaging or specifications of the flash memory chip 301, e.g., the number of the flash memory chips 301, or the number of command resources stipulated by the flash memory control apparatus 101.

The commands 2202.a through 2202d are on standby in the command queue 2201 until a resource for an execution is free. The command queue 2201, for example, adopts the FIFO (first-in, first-out) mode.

To switch the command execution sequence, it is necessary to guarantee that the processing result will not be changed in accordance with the switch. For example, in a case where the flash memory control apparatus 101 receives a write command and a read command for the same physical page 305, and as a result of the switch, the read command moves ahead of the write command, which had been enqueued in front thereof, the data, which is read, will change. Therefore, when switching the command execution sequence, it is necessary to check the relationship between a command whose location will be changed, and a command, which could be overtaken.

As the inter-command relationship, in addition to checking that the target logical address is the same at this point, the flash memory control apparatus 101 must also check the relationship between the reserved physical resources. For example, the physical pages 305 in a physical block 304 of a flash memory chip 301 are configured on the assumption that writing will be performed in a specified sequence. Therefore, when a reservation has been performed such that two certain write commands write to consecutive physical pages 305 of the same physical block 304, a failure will occur in a case where the write command enqueued ahead leaps over the write command enqueued next.

Meanwhile, in this mode for the invention, a logical chunk 1002 is linked with a physical chunk 1005, and multiple logical chunks 1002 respectively use individual physical resources the same as in the first mode for the invention. Therefore, it is guaranteed that there will be no correlation between commands with respect to different logical chunks 1002.

Figure 23:
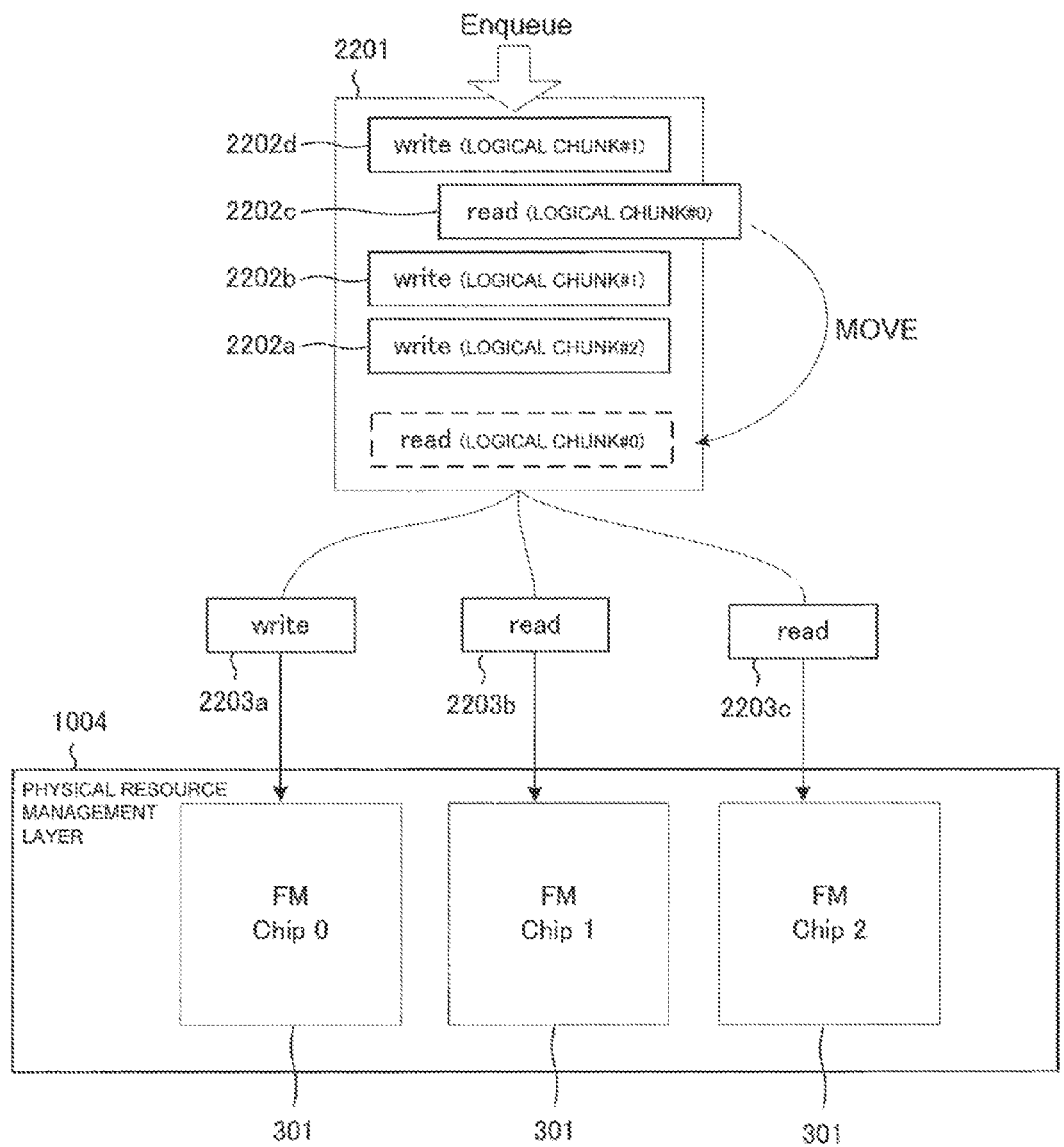
FIG. 23 shows an example of a change in a command execution sequence.

FIG. 23 shows an example of changing a command execution sequence. The above-mentioned commands 2202a, 2202b, 2202c, and 2202d are stored in enqueued sequence in the command queue 2201. That is, command 2202a is stored at the head of the command queue 2201. It is supposed here that the logical-physical translation program 205 migrates the command 2202c to the head of the command queue 2201 in preference to the other commands. According to the method for changing the conventional command execution sequence, the correlation between the command 2202c and the commands 2202a and 2202b, which have been enqueued ahead thereof, must be checked.

The command 2202c, which is targeted to have its location changed in the command queue 2201, will be treated as the target command here, and a command, which will access the same logical chunk 1002 as the target command, will be treated as the interference command. The logical-physical translation program 205 of this mode for the invention can unconditionally migrate the target command to the head of the command queue 2201 in a case where it is recognized that the interference command does not exist ahead the target command in the command queue 2201. However, in a case where the interference command does exist ahead of the target command in the command queue 2201, the logical-physical translation program 205 must check the correlation between the commands in order to migrate the target command before the interference command.

Figures 24, 25, 26:
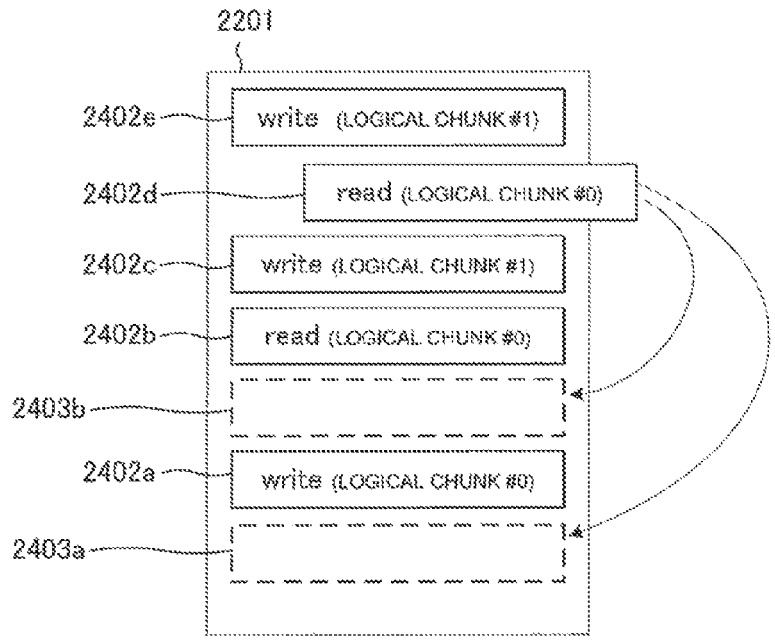
FIG. 24 shows an example of a limitation on changing the con and execution sequence.
FIG. 25 shows an LBA group priority table.
FIG. 26 shows a logical chunk priority table.

FIG. 24 shows an example of a limitation to changing the command execution sequence. The commands 2402a, 2402b, 2402c, 2402d, and 2402e are stored in enqueued sequence in the command queue 2201. The commands 2402a, 2402b, 2402c, 2402d, and 2402e, respectively, are a write command with respect to the logical chunk #0, a read command with respect to the logical chunk #0, a write command with respect to the logical chunk #1, a read command with respect to the logical chunk #0, and a write command with respect to the logical chunk #1.

In a case where the logical-physical translation program 205 migrates the command 2402d here, a migration to location 2403b in the command queue 2201 is unconditionally possible, but a migration to location 2403a is not unconditionally possible.

In a case where the logical-physical translation program 205 migrates the command 2402d to the location 2403h, the command 2402c is one of the commands overtaken by the command 2402d, but since the command 2402c is an I/O command with respect to the logical chunk #1, which differs from that of the command 2402d, the lack of correlation with the command 2402d is guaranteed. The command 2402b, which is another command overtaken by the command 2402d, is an I/O command with respect to the logical chunk #0, which is the same as that of the command 2402d, but since the command 2402d and the command 2402b are both read commands, the processing result will not change as a result of changing the execution sequence.

Alternatively, in a case where the logical-physical translation program 205 migrates the command 2402d to the location 2403a, since the command 2402a, which is overtaken by the command 2402d, is a write command with respect to the same logical chunk #0 as that of the command 2402d, unconditional migration is not possible. An unconditional migration is also not possible in a case where a read command moves ahead of a write command. However, the advisability of a command migration can be determined in accordance with the logical-physical translation program 205 checking the relationship between commands in detail. For example, the logical-physical translation program 205 may store a preceding command location, which is the location of the lead command of commands with respect to the same logical chunks 1002 as the target command in the command queue 2201, and may determine the location immediately after the preceding command location as the migration destination of the target command.

FIG. 25 shows an LBA group priority table 2500. The LBA group priority table 2500 comprises an entry for each LBA group 1101. Each entry comprises a LBA group number 2501, a logical chunk number 2502, a page group number 2503, and a LBA group priority 2504. The LBA group number 2501 shows the LBA group 1101 of the entry. The logical chunk number 2502 shows the allocation-destination logical chunk 1002 of the relevant LBA group 1101. The page group number 2503 shows the allocation-destination page group 1102 of the relevant LBA group 1101. The LBA group priority 2504 shows the need for prioritizing the relevant LBA group 1101. In this mode for the invention, a three-stage value (high, medium, low) is defined for the LBA group priority 2504.

The LBA group priority 2504, for example, may be configured here by the logical-physical translation program 205 based on an I/O pattern, or may be configured in accordance with a specification from the user. In a case where the LBA group priority 2504 is configured by the logical-physical translation program 205, for example, the logical-physical translation program 205 increases the LBA group priority 2504 of an LBA group 1101 with respect to which large numbers of read commands are issued. This is because read response time is extremely shorter than write response time in a flash memory chip 301, and the preferential execution of reads has little influence on other commands. Alternatively, in a case where the LBA group priority 2504 is specified by the user, the user may, in accordance with policy, configure the LBA group priority 2504 of a relevant LBA group 1101 high so as to give preference to a DB (Database) access or other such I/O request requiring a fast response time, or may configure the LBA group priority 2504 low for a LBA group 1101 corresponding to a 110 request with a low response time requirement, such as a log output.

FIG. 26 shows a logical chunk priority table 2600. The logical chunk priority table 2600 comprises an entry for each logical chunk 1002. Each entry comprises a logical chunk number 2601, a logical chunk priority 2602, and a preceding command location 2603. The logical chunk number 2601 shows the relevant logical chunk 1002. The logical chunk priority 2602 shows the need for prioritizing a command with respect to the relevant logical chunk 1002. The preceding command location 2603 is in the command queue 2201a pointer showing the location of the earliest enqueued command of the commands with respect to the relevant logical chunk 1002.

The logical chunk priority 2602 corresponds to the LBA group priority 2504 of the LBA group priority table 2500. For example, the logical-physical translation program 205 allocates an LBA group 1101 having a LBA group priority 2504 of "high" to a logical chunk 1002 with a logical chunk priority 2602 of "high". In accordance with this, when queuing commands in the command queue 2201, the logical-physical translation program 205 enqueues a command with respect to the relevant logical chunk 1002 to a location that gives preference to a command with respect to another logical chunk 1002. In so doing, the logical-physical translation program 205 references the preceding command location 2603 and determines an enqueueable location. At this point, a command with respect to a certain logical chunk 1002 can unconditionally move ahead of the relevant logical chunk 1002 to the location immediately subsequent to the preceding command location 2603 of the relevant logical chunk 1002. Upon executing enqueuing, the logical-physical translation program 205 updates the preceding command location 2603 on the basis of the enqueue location.

For example, in a case where the command queue 2201 manages commands in a double-ended queue, the command insertion location pointer can be used as the preceding command location 2603. The specific command management data structure is not limited to this mode for the invention.

(Allocation Destination Change Process Based on LBA Group Priority Change)

An allocation destination change process triggered by the changing of the LBA group priority will be explained below.

Figure 27:
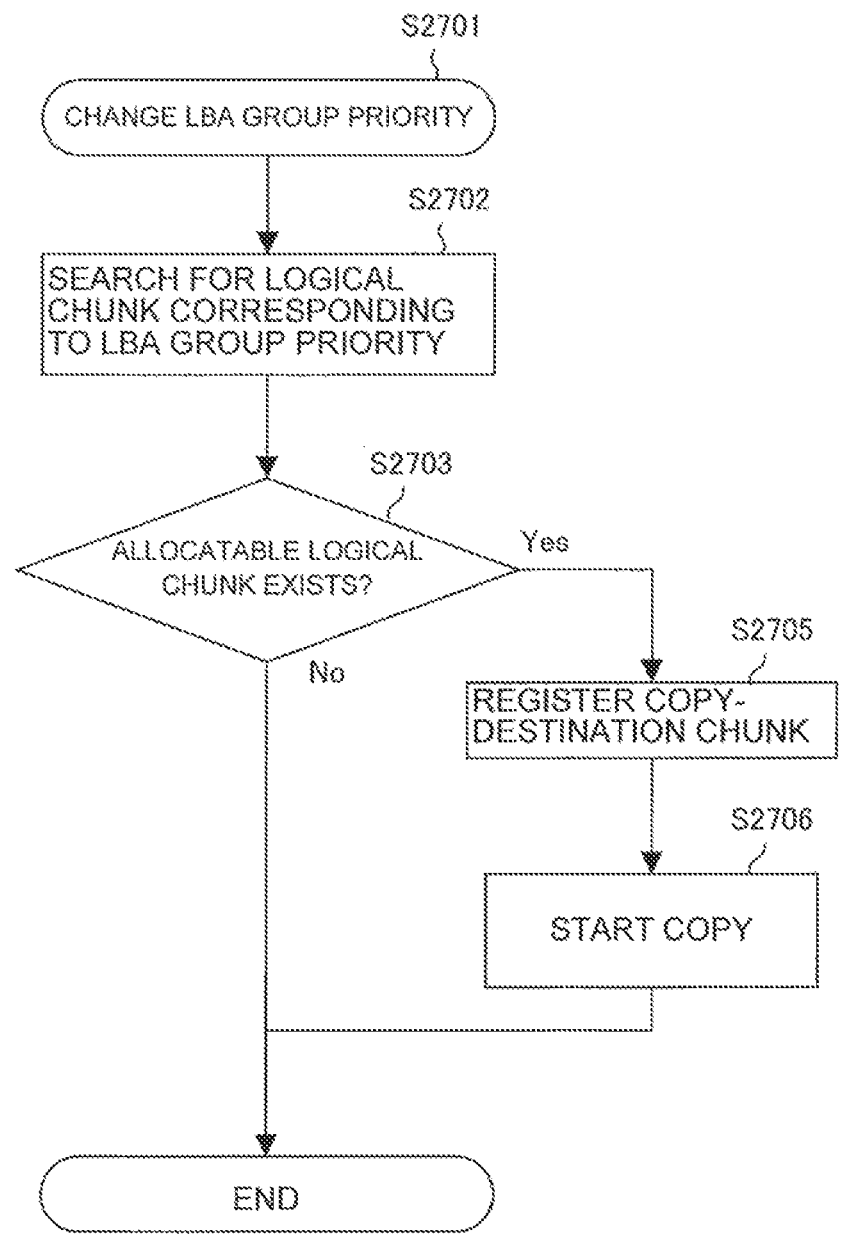
FIG. 27 shows an allocation destination change process based on a LBA group priority change.

FIG. 27 shows an allocation destination change process based on the changing of a LBA group priority. The LBA group priority 2504, as described hereinabove, may be changed by the logical-physical translation program 205 on the basis of an I/O pattern, or may be explicitly changed by the user. When the LBA group priority 2504 of a certain LBA group 1101 is changed (S2701), the logical-physical translation program 205, in order to change the allocation destination of the relevant LBA group 1101, references the group priority table 2500 and searches for a logical chunk 1002 for storing the LBA group 1101 comprising the post-change LISA group priority 2504 of the relevant LBA group 1101 (S2702).

Next, the logical-physical translation program 205 determines whether or not a logical chunk 1002, which is in an allocatable state, exists among the logical chunks 1002 detected in accordance with the search (S2703). In a case where a logical chunk 1002 detected here comprises a free page group capable of being allocated to the LBA group 1101, the logical-physical translation program 205 determines that there is an allocatable state.

At this time, the logical-physical translation program 205 may use a data structure corresponding to the number of free page groups and the state of a logical chunk 1002 to facilitate finding an allocatable-state logical chunk 1002. For example, the logical-physical translation program 205 uses a logical chunk queue showing logical chunks 1002 sorted by number of free page groups and number of free pages.

In a case where it has been determined that an allocatable-state logical chunk 1002 does not exist (S2703: No), logical-physical translation program 205 terminates this process flow. Here, the logical-physical translation program 205 may execute an allocation destination change for the relevant LBA group 1101 in accordance with the next and subsequent LBA group priority changes, or may reserve a table and execute an allocation asynchronously to the LBA group priority change.

In a case where it has been determined that an allocatable-state logical chunk 1002 exists (S2703: Yes), the logical-physical translation program 205 registers the allocatable-state logical chunk 1002 as the copy-destination chunk of the relevant LBA group (S2705) in the chunk allocation table 1103, starts copying from the logical chunk 1002 allocated to the relevant LBA group to the copy-destination chunk (S2706), and ends this flow. Furthermore, the data copy of the relevant LBA group may be executed synchronously as an extension of this allocation destination change process, or may be executed asynchronously subsequent to this allocation destination change process having ended.

The preceding is the flow of processing for changing an allocation destination based on a LBA group priority change.

In a case where the LBA group priority of a specific LBA group 1101 is made higher than the criterion for a preconfigured logical page group priority and regarded as a priority LBA group, and the logical chunk priority of a specific logical chunk 1002 is made higher than the criterion for a preconfigured logical chunk priority and regarded as a priority logical chunk, the logical-physical translation program 205 may associate the priority LBA group with a page group 1102 in the priority logical chunk.

(Command Enqueue Process)

A command enqueue process for changing the command execution sequence based on a logical chunk 1002 will be explained below.

FIG. 28 shoes a command enqueue process. The logical-physical translation program 205, upon receiving a command, treats the received command as a target command and starts the command etiquette process (S2801). The target command, which serves as a trigger for the command enqueue process, may be a command received from the host 110, or may include a command for reclamation issued by the flash memory control apparatus 101. However, the logical-physical translation program 205, in a case where it is desirable to shorten the response time of the I/O0 request from the host 110, need not treat a command issued from the flash memory control apparatus 101 as the target command, and need not execute the command enqueue process.

Next, the logical-physical translation program 205 identifies a target logical chunk, which is a logical chunk 1002 targeted by the target command (S2802). Next, the logical-physical translation program 205 references the target logical chunk entry in the logical chunk priority table 2600, acquires the logical chunk priority 2602 of the target logical chunk, and determines whether or not the target logical chunk is the priority logical chunk (S2803). In a case where the acquired logical chunk priority 2602 is "high" here, the logical-physical translation program 205 determines that the target logical chunk 1002 is the priority logical chunk. Furthermore, the logical-physical translation program 205 may determine that the target logical chunk is the priority logical chunk in case where the logical chunk priority of the target logical chunk is higher than a preconfigured criterion.

In a case where it has been determined that the target logical chunk 1002 is not the priority logical chunk (S2803: No), the logical-physical translation program 205 enqueues the target command at the end of the command queue 2201 as is normal (82804) and ends this flow.

In a case where it has been determined that the target logical chunk 1002 is the priority logical chunk (S2803:Yes), the logical-physical translation program 205 acquires the preceding command location 2603 of the target logical chunk 1002 from the logical chunk priority table 2600 (S2806), enqueues the target command in a location based on the acquisition result. (S2807), and ends the flow. In a case where, in accordance with the acquisition result, a value exists for the preceding command location 2603 in the logical chunk priority table 2600, the logical-physical translation program 205 enqueues the target command in the location immediately after the preceding command location 2603 here. Alternatively, in a case where a value does not exist for the preceding command location 2603 in the logical chunk priority table 2600 in accordance with the acquisition result, the logical-physical translation program 205 recognizes that another command of the target logical chunk does not exist in the command queue 2201, and enqueues the target command at the head of the command queue 2201.

The preceding is the flow of processing for enqueuing a command.

In S2803, the logical-physical translation program 205 partitioned its determination of the logical chunk priority 2602 into "high" and other values, but a more detailed determination may be executed. For example, in a case where a more detailed logical chunk priority 2602 is configured in each logical chunk 1002, and the command of a logical chunk 1002 with a higher logical chunk priority 2602 is enqueued in the command queue 2201, the logical-physical translation program 205 does not have to change the enqueue location, and may avoid enqueuing at the head of the command queue 2201.

In the command enqueue process, the logical-physical translation program 205 may make the command migration destination a location in the middle of the command queue 2201, or may select the command migration destination from multiple locations based on the relationship with another command with respect to the same logical chunk 1002. The logical-physical translation program 205 may also manage the location of that command for each logical chunk 1002 in the command queue 2201 using a bitmap or other such location information, and may perform the command enqueue process using this location information.

According to this mode for the invention, configuring the logical chunk priority 2602 of an identified logical chunk 1002 higher than that of another logical chunk 1002 and specifying the identified logical chunk 1002 in the priority logical chunk makes it possible to arrange an I/O request for the priority logical chunk prior to an I/O request with respect to another logical chunk in the command queue 2201, and preferentially execute a command with respect to the priority logical chunk.

Furthermore, the flash memory module described hereinabove may be a single storage apparatus comprising a nonvolatile storage medium and a media controller, a storage apparatus comprising one or more such storage apparatuses and a higher-level controller, which is a controller coupled to this storage apparatus, or a storage system, which combines multiple such storage apparatuses. A higher-level apparatus may be a host computer coupled to either a storage apparatus or a storage system, or a higher-level controller coupled to a storage apparatus.

In a nonvolatile semiconductor memory comprising a flash memory, it is possible to flexibly change a logical chunk associated with a logical address. This makes it possible to apply a control policy comprising QoS (Quality of Service) to each logical chunk, and to enhance physical resource utilization efficiency by allocating a logical address to an appropriate logical chunk.

In the above explanation, a number indicating a target shown in the respective tables may be an address indicating this target or another such identifier.

The technology explained using the above examples can be expressed as follows.

(Wording 1)

A storage control apparatus, comprising:
a storage unit that stores association information showing, multiple physical chunks which are configured in a physical address space of a nonvolatile semiconductor memory, multiple logical storage areas which are configured in a logical address space of the nonvolatile semiconductor memory, multiple logical chunks which are respectively associated with the multiple physical chunks, and an association between a logical storage area and a logical chunk;
an association unit which changes the association by changing the association information in accordance with a state of the nonvolatile semiconductor memory, and identifies based on the association information a physical storage area corresponding to the logical storage area specified by an input/output request from a computer; and an execution unit which executes an input/output request from the computer with respect to the identified physical storage area, (Wording 2)

A storage control apparatus according to wording 1 wherein the association information shows an association of a first physical chunk and a first logical chunk, an association of a second physical chunk and a second logical chunk, and an association of a first logical chunk and a first logical storage area, and
the association unit migrates data corresponding to the first logical storage area in the first physical chunk to the second physical chunk in accordance with the states of the multiple physical chunks, and associates the first logical storage area with the second logical chunk in the association information.

(Wording 3)

A storage control apparatus according to wording 2, wherein the association information shows multiple physical blocks in each physical chunk and multiple physical pages in each physical block, multiple logical page groups configured in a logical address space, multiple logical pages in each logical page group, multiple logical slot groups in each logical chunk, and multiple logical slots in each logical slot group, and shows a first logical page in a first logical page group, a first slot group in the first logical chunk, and the association of the first logical slot group and the first logical page group, and
the association unit migrates data corresponding to the first logical page group in the first physical chunk to the second physical chunk in accordance with the states of the multiple physical chunks, and associates the first logical page group with a logical slot group in the second logical chunk.

The technology explained using the above examples can also be expressed as follows.

(Wording 4)

A computer-readable medium that stores a storage control program which causes a computer to execute a process comprising:
storing association information showing multiple physical chunks which are configured in a physical address space of a nonvolatile semiconductor memory, multiple physical storage areas in each multiple chunk, multiple logical chunks which are respectively configured in the multiple physical chunks, multiple logical storage areas configured in a logical address space of the nonvolatile semiconductor memory, and an association between a logical storage area and a logical chunk;
changing the association by changing the association information in accordance with the state of the nonvolatile semiconductor memory;
identifying based on the association information a physical storage area corresponding to a logical storage area configured in accordance with an input/output request from a computer; and
executing an input/output request from the computer with respect to the identified physical storage area.

The terminology in these wordings will be explained. The storage unit, for example, corresponds to the memory 106. The association information, for example, corresponds to the logical-physical translation information 206. The association unit, for example, corresponds to the CPU 105. The execution unit, for example, corresponds to the flash memory controller 103. The physical storage area, for example, corresponds to the physical block 304 and the physical page 305. The logical storage area, for example, corresponds to the logical page 403 and the LBA group 1101. The logical page group, for example, corresponds to the LBA group 1101. The logical slot, for example, corresponds to the LC page 1003. The logical slot group, for example, corresponds to the page group 1102.

REFERENCE SIGNS LIST

101: Flash memory control apparatus
102: Storage interface
103: Flash memory controller
104: Buffer
106: Memory
107: Flash memory interface 110: Host
201: Data transfer control program
202: Flash storage control program
203: Operating system
204: Input/output control program
205: Logical-physical translation program
206: Logical-physical translation information
301: Flash memory chip
304: Physical block
305: Physical page
401: Logical address layer
403: Logical page
1001: Logical chunk layer
1002: Logical chunk
1003: LC page
1004: Physical resource management layer
1005: Physical chunk
1101: LBA group
1102: Page group
1103: Chunk allocation table

The invention claimed is:

1. A storage control apparatus, comprising:
a storage unit configured to store association information showing multiple physical chunks which are configured in a physical address space of a nonvolatile semiconductor memory, multiple logical storage areas which are configured in a logical address space of the nonvolatile semiconductor memory, multiple logical chunks which are respectively associated with the multiple physical chunks, and an association between a logical storage area and a logical chunk;
an association unit configured to change the association by changing the association information in accordance with states of the multiple physical chunks, and identify based on the association information a physical storage area corresponding to a logical storage area specified by an input/output request; and
an execution unit configured to execute the input/output request with respect to the identified physical storage area, wherein:
more than one of the multiple logical storage areas are associated with one of the multiple logical chunks,
the association information indicates an association of a first physical chunk and a first logical chunk, an association of a second physical chunk and a second logical chunk, an association of a first logical chunk and a first logical storage area, an association of the second logical chunk and a second logical storage area,
the association unit is configured to migrate data corresponding to the first logical storage area in the first physical chunk to the second physical chunk in accordance with the states of the multiple physical chunks, and associate the first logical storage area with the second logical chunk in the association information while maintaining the association of the second logical chunk and the second logical storage area, and
the data corresponding to the first logical storage area before the migration are stored in different blocks that are separately erasable in the first physical chunk while the data corresponding to the first logical storage area after the migration are stored in an identical erasable block in the second physical chunk.

2. The storage control apparatus according to claim 1, wherein the association information indicates multiple physical blocks in each physical chunk and multiple physical pages in each physical block, multiple logical page groups configured in a logical address space, multiple logical pages in each logical page group, multiple logical slot groups in each logical chunk, and multiple logical slots in each logical slot group, and indicates a first logical page in a first logical page group, a first slot group in the first logical chunk, and an association of the first logical slot group and the first logical page group, and
the association unit is configured to migrate data corresponding to the first logical page group in the first physical chunk to the second physical chunk in accordance with the states of the multiple physical chunks, and associate the first logical page group with a logical slot group in the second logical chunk.

3. The storage control apparatus according to claim 2, wherein the association unit is configured to measure a load of each logical page group, and based on results of the measurements, migrate data corresponding to the first logical page group in the first physical chunk to the second physical chunk, and associate the first logical page group with a logical slot group in the second logical chunk.

4. The storage control apparatus according to claim 3, wherein the load is a write frequency.

5. The storage control apparatus according to claim 4, wherein the association information indicates a range of write frequencies of a logical page group associated with each logical chunk.

6. The storage control apparatus according to claim 5, wherein the association information indicates the number of logical slot groups in each logical chunk.

7. The storage control apparatus according to claim 6, wherein, in a case where the number of logical slot groups in the second logical chunk is lower than a preconfigured criterion for the number of logical slot groups and the write frequency of the first logical page group is higher than a preconfigured criterion for the write frequency, the association unit is configured to associate the first logical page group with a logical slot group in the second logical chunk.

8. The storage control apparatus according to claim 7, wherein the execution unit is configured to write data in free physical page units, and erase data in physical block units.

9. The storage control apparatus according to claim 8, wherein the nonvolatile semiconductor memory is a flash memory.

10. The storage control apparatus according to claim 2, wherein the storage unit comprises a queue for storing input/output requests in a sequence of execution by the execution unit,
the association information indicates a logical chunk priority which is the priority of each logical chunk, and
in a case where a second input/output request is received subsequent to a first input/output request, and, in addition, a logical chunk priority of a logical chunk associated with a target of the second input/output request is higher than a logical chunk priority of a logical chunk associated with a target of the first input/output request, the association unit is configured to arrange the second input/output request ahead of the first input/output request in the execution sequence of the queue.

11. The storage control apparatus according to claim 10, wherein the association information indicates a logical page group priority which is the priority of each logical page group, indicates that a logical page group priority of a specific logical page group is higher than a preconfigured criterion for a logical page group priority, and indicates that a logical chunk priority of a specific logical chunk is higher than a preconfigured criterion of the logical chunk, and the association unit is configured to associate the specified logical page group with a logical slot group in the specific logical chunk.

12. A storage control method, comprising:
storing association information indicating multiple physical chunks which are configured in a physical address space of a nonvolatile semiconductor memory, multiple physical storage areas in each of the multiple physical chunks, multiple logical chunks which are respectively associated with the multiple physical chunks, multiple logical storage areas configured in a logical address space of the nonvolatile semiconductor memory, and an association between a logical storage area and a logical chunk;
changing the association by changing the association information in accordance with a state of the nonvolatile semiconductor memory;
identifying based on the association information a physical storage area corresponding to a logical storage area specified in accordance with an input/output request from a computer; and
executing an input/output request from the computer with respect to the identified physical storage area, wherein:
the association information indicates an association of a first physical chunk and a first logical chunk, an association of a second physical chunk and a second logical chunk, an association of a first logical chunk and a first logical storage area, an association of the second logical chunk and a second logical storage area,
the association information is changed to associate the first logical storage area with the second logical chunk in accordance with a state of the nonvolatile semiconductor memory while maintaining the association of the second logical chunk and the second logical storage area,
data corresponding to the first logical area before the association information change are stored in different blocks that are separately erasable in the first physical chunk while data corresponding to the first logical area after the association information change are stored in an identical erasable block in the second physical chunk, and
more than one of the multiple logical storage areas are associated with one of the multiple logical chunks.

* * * * *